United States Patent [19]

Allen

[11] Patent Number: 5,736,016
[45] Date of Patent: *Apr. 7, 1998

[54] ELECTROLYTIC CELL FOR PRODUCING A MIXED OXIDANT GAS

[75] Inventor: Jeffrey D. Allen, Rockland, Id.

[73] Assignee: Electrosci, Inc., Irvine, Calif.

[*] Notice: The term of this patent shall not extend beyond the expiration date of Pat. No. 5,427,658.

[21] Appl. No.: 637,711

[22] PCT Filed: Oct. 20, 1994

[86] PCT No.: PCT/US94/12027

§ 371 Date: Oct. 10, 1996

§ 102(e) Date: Oct. 10, 1996

[87] PCT Pub. No.: WO95/11326

PCT Pub. Date: Apr. 27, 1995

Related U.S. Application Data

[63] Continuation-in-part of Ser. No. 141,229, filed as PCT/US94/12027, Oct. 20, 1994 published as WO95/11326, Apr. 27, 1995, Pat. No. 5,427,658.

[51] Int. Cl.⁶ .................. C25B 9/00; C25B 15/08
[52] U.S. Cl. .................. 204/237; 204/256; 204/258; 204/262; 204/266
[58] Field of Search .................. 205/556; 204/237, 204/252–258, 263–266

[56] References Cited

U.S. PATENT DOCUMENTS

| | | | |
|---|---|---|---|
| 3,767,557 | 10/1973 | Lamm | 204/263 |
| 4,144,146 | 3/1979 | Leutner et al. | 205/495 |
| 4,217,186 | 8/1980 | McRae | 205/531 |
| 4,459,196 | 7/1984 | Iijma et al. | 204/258 |
| 4,784,735 | 11/1988 | Sorenson | 205/530 |
| 4,963,241 | 10/1990 | Brattan | 204/237 |
| 5,133,848 | 7/1992 | Meyers | 204/263 X |
| 5,427,658 | 6/1995 | Allen | 205/556 |

OTHER PUBLICATIONS

Japanese Patent Abstract, Publication No. 59197582, Publication Date 1984, p. 1 No Month.

*Primary Examiner*—Donald R. Valentine
*Attorney, Agent, or Firm*—Christie, Parker & Hale, LLP

[57] ABSTRACT

An electrolytic cell for generating a mixed oxidant gas for treating bodies of water comprises an anode chamber that is defined by an anode plate at one end, a permeable membrane at an opposite end, and a first sealing gasket interposed therebetween. A cathode chamber is adjacent the anode chamber and is defined by a cathode plate at one end, the permeable membrane at an opposite end, and a second sealing gasket interposed therebetween, the first and second gaskets being separated by the permeable membrane. An anolyte reservoir is external from the anode chamber for accommodating a volume of anolyte therein, and is connected to the anode chamber to circulate anolyte thereto and to receive mixed oxidant gas therefrom. A catholyte reservoir is external from the cathode chamber for accommodating a volume of catholyte therein, and is connected to the cathode chamber to circulate catholyte thereto and to receive gas therefrom. The anolyte within the anolyte reservoir, and the catholyte within the catholyte reservoir, are each maintained at a controlled specific gravity.

27 Claims, 10 Drawing Sheets

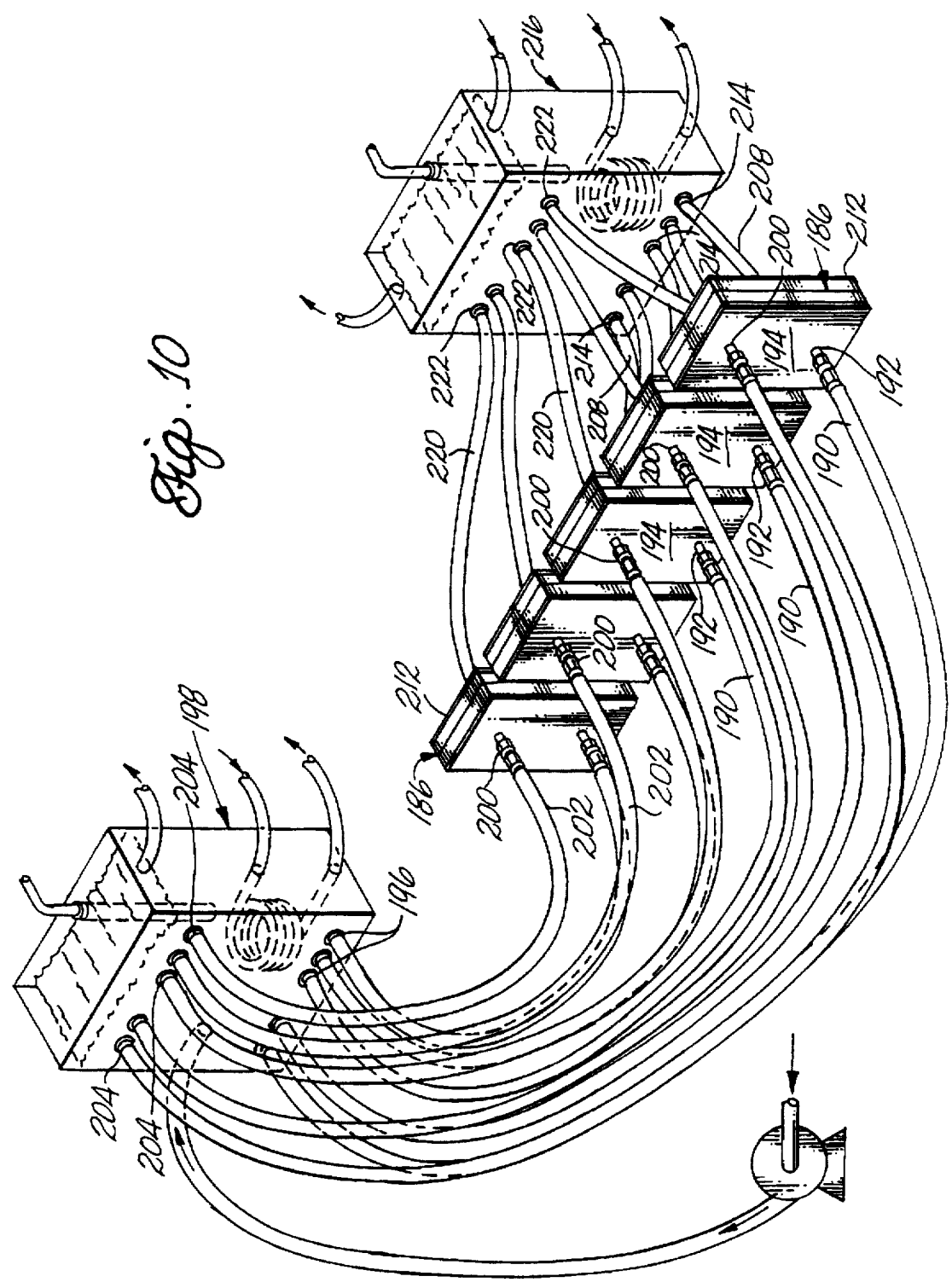

5,736,016

ELECTROLYTIC CELL FOR PRODUCING A MIXED OXIDANT GAS

REFERENCE TO COPENDING APPLICATION

This patent application is a continuation-in-part application of U.S. patent application Ser. No. 08/141,229, filed as PCT/US94/12027, Oct. 20, 1994 published as WO95/11326, Apr. 27, 1995, now U.S. Pat. No. 5,427,658.

FIELD OF THE INVENTION

The present invention relates generally to an electrolytic cell for generating via electrolytic reaction an oxidant gas comprising a mixture of different chlorine containing species for treating bodies of water.

BACKGROUND OF THE INVENTION

The use of various types of water treatment chemicals for controlling biological activity such as spores, bacteria, viruses, allergy, fungi, and any other biological phenomenon that adversely affects the quality of water is well known. Chemicals added to water for the purpose of controlling scaling and corrosion are also known. Such chemicals are often used in recreational water such as swimming pools, theme parks, in industrial or commercial process water such as cooling towers and for industrial and municipal sewage treatment and the like, and in drinking water. In light of today's increased environmental awareness, the need to both minimize the types of chemicals that are routed for sewage treatment and preserve water as a valuable resource and, therefore, the need to maximize the use and recyclability of water used for both industrial and recreational applications, is greater than ever. Accordingly, in order to maximize the utility and recyclability of the water being used in such applications it is desired that the chemical agents used to treat the water be effective in controlling biological activity, corrosion, and scaling so that the water can be reused over and over again and any blowdown water be free of noxious or toxic materials.

The use of chlorine for disinfecting bodies of water such as, swimming pools, baths, reservoirs, cooling tower water, recreational water, or any form of water that is exposed to the open air, is well known. In the past, chlorine has usually been supplied by direct application of chlorine gas ($Cl_2$) from tanks containing the gas under pressure. Chlorine has also been supplied by electrolytic generation via an electrolytic cell. Other chlorine containing gas species such as chlorine dioxide ($ClO_2$) have also been used in disinfecting bodies of water. Chlorine dioxide is a dangerous and explosive gas and is usually produced as an aqueous solution at the point of usage by chemical decomposition of chlorine salt. Production of chlorine dioxide electrochemically from chlorides was also unknown in the literature prior to about 1982.

Lindstaedt U.S. Pat. No. 2,887,444 discloses a system in which a body of water, such as a swimming pool, is provided with a low concentration of dissolved common salt and a stream of water is removed from the main body and electrolyzed to produce chlorine, and the chlorine and water stream are returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for chlorinating bodies of water are shown in Oldershaw U.S. Pat. No. 3,351,542, Colvin U.S. Pat. No. 3,378,479, Kirkham U.S. Pat. No. 3,669,857 and Yates U.S. Pat No. 4,097,356. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosulfonic acid polymer membranes. The perfluorosulfonic acid membranes were developed by Dupont for use in electrolytic cells.

Dotson U.S. Pat. No. 3,793,163 discloses the use of Dupont perfluorosulfonic acid membranes in electrolytic cells and makes reference to U.S. Pat. Nos. 2,636,851; 3,017,338, 3,560,568; 3,4696,077; 2,967,807; 3,282,875 and British Pat. No. 1,184,321 as discussing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat No. 4,010,085 and Westerlund U.S. Pat. No. 4,069,128.

Use of perfluorosulfonic acid membrane is also discussed in the technical literature, e.g. Dupont Magazine, May–June 1973, pages 22–25 and a paper entitled: "Perfluorinated on Exchange Membrane" by Grot, Munn, and Walmsley, presented to the 141st National Meeting of the Electrochemical Society, Houston, Tex., May 7–11, 1972.

The structure of electrodes used in electrolytic cells is set forth the previously listed patents. Additionally, the following patents show particular configurations of anodes or cathodes used in such cells.

Giacopelli U.S. Pat. No. 3,375,184 discloses an electrolytic cell with controllable multiple electrodes which are flat plates in electroplating cells.

Lohreberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

In "The $ClO_2$ content of chlorine obtained by electrolysis of NaCl," Electrochemical Technology 5, 56–58 (1967) Western and Hoogland report that $ClO_2$ is not produced in the electrolysis of NaCl in the absence of chlorates.

Sweeney U.S. Pat. No. 4,256,552 discloses an electrolytic generator for chlorination of swimming pools, water systems, etc., in which a bipolar electrode is positioned in an anode compartment between an anode and an cation-exchange membrane in the wall separating the compartments.

Sweeney U.S. Pat. No. 4,334,968 discloses improvements on the cell or generator of U.S. Pat. No. 4,256,552 and discloses the production of chlorine dioxide in the cell.

Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions.

Sweeney U.S. Pat. No. 4,308,117 discloses a cell having three compartments, with an anode and cathode in the outer compartments and a bipolar electrode in the central compartment. A cation-exchange membrane is positioned in the wall between the central compartment and the cathode compartment, while an anion-exchange membrane is positioned in the wall between the central compartment and the anode compartment.

Sweeney U.S. Pat. No. 4,324,635 discloses a cell having an anode compartment, a cathode compartment, and a separating wall comprising a cation-exchange membrane therein. The cell includes a pump for circulating some of the cathode solution from the cathode compartment to the anode compartment for pH control.

Sweeney U.S. Pat. 4,804,449 discloses an electrolytic generator comprising an anode compartment, a cathode compartment, at least one wall separating the anode and cathode compartment comprising an ion exchange membrane therein, and at least one bipolar electrode positioned either in the anode or cathode compartment.

It has been discovered that an optimum degree of control over biological activity, scaling, and corrosion may be realized by using a gas composition comprising a mixture of chlorine gas and chlorine dioxide gas. The electrolytic devices disclosed in the above-referenced patents are concerned mainly with the generation of chlorine gas via electrolytic reaction. Many of the above-referenced patents generate the chlorine gas using a batch-type operation rather than a continuous-type operation. The use of a batch-type system is known to cause variations in the composition of the gas species produced as the concentration of the electrolyte changes during use, ultimately limiting the effectiveness of such systems. Additionally, many of the electrolytic cells known in the art operate in an electrically inefficient manner due to their construction, requiring a large input of voltage to both overcome the internal resistance of the electrolytic cell and achieve, the desired electrochemical reaction.

It is, therefore, desirable that an electrolytic cell be constructed in a manner that will allow the generation of a mixed oxidant gas comprising chlorine and chlorine dioxide in a predetermined ratio to effect maximum control of biological activity, scaling, and corrosion in a body of water. It is desirable that the electrolytic cell be constructed in a manner facilitating the generation of the chlorine gas and chlorine dioxide gas in a preferred proportion without variations in such proportion during the operation of the electrolytic cell.

It is desirable that the electrolytic cell be constructed in a manner which promotes high electrical efficiency, thereby utilizing energy more efficiently in achieving the desired electrolytic reactions and producing the desired gases. It is desirable that the electrolytic cell be constructed in a manner that facilitates its operation and service in the field. It is also desirable that the electrolytic cell be constructed in a manner that is practical from both a manufacturing and an economic viewpoint.

SUMMARY OF THE INVENTION

There is, therefore, provided in practice of this invention an eletrolytic cell for producing a mixed oxidant gas for controlling biological activity, corrosion, and scaling in bodies of water. The electrolytic cell comprises an anode plate, a cathode plate, and a membrane plate interposed between the anode and cathode plate. An anode sealing gasket comprising an open cavity located at its center is interposed between the anode plate and the membrane plate to form an anode chamber for accommodating a volume of anolyte solution. The anode sealing gasket may comprise a bipolar electrode extending across a portion of the open cavity. A second sealing gasket comprising an open cavity located at its center is interposed between the cathode plate and the membrane plate to form a cathode chamber for accommodating a volume of catholyte solution.

An anolyte reservoir external to the anode chamber contains a predetermined volume of anolyte and is hydraulically connected to an anolyte inlet in the anode plate for supplying the anolyte to the anode chamber. A mixed gas and anolyte outlet in the anode plate is connected to a mixed gas and anolyte inlet in the anolyte reservoir for both removing the mixed oxidant gas produced in the anode chamber and continuously circulating the anolyte through the anode chamber. The anolyte reservoir comprises an anolyte reservoir gas outlet for removing the mixed oxidant gas from the anolyte reservoir and introducing it into the body of water. The anolyte reservoir comprises an anolyte feed inlet for receiving saturated anolyte solution from an anolyte make-up tank external to the anolyte reservoir and anode chamber. The anolyte solution in the anolyte make-up tank is transported into the anolyte reservoir by gravity. The anolyte in the anolyte reservoir is transported to the anode chamber by gravity and circulated through the anode chamber by thermal convection and the migration of the mixed oxidant gas.

A catholyte reservoir external to the cathode chamber contains a predetermined volume of catholyte and is hydraulically connected to a catholyte inlet in the cathode plate for supplying the catholyte to the cathode chamber. A gas and catholyte outlet in the cathode plate is connected to a gas and catholyte inlet in the catholyte reservoir for both removing the gases produced in the cathode chamber and continuously circulating catholyte through the cathode chamber. The catholyte reservoir comprises a gas outlet for removing the gases from the catholyte reservoir. The catholyte reservoir comprises a fresh water inlet and means for regulating the introduction of the water for maintaining the specific gravity of the catholyte at a predetermined level. The catholyte in the catholyte reservoir is transported to the cathode chamber by gravity and circulated through the cathode chamber by the migration of the gases.

A voltage in the range of from three to ten volts is applied across the anode and cathode to effect an electrolysis reaction in the anode chamber producing a mixed oxidant gas comprising chlorine dioxide ($ClO_2$) and chlorine ($Cl_2$), and in the cathode chamber producing hydrogen ($H_2$) gas. The electrolysis reaction in the anode chamber is driven to completion by the efficient removal of $H_2$ gas in the cathode chamber and the migration of sodium ($Na^+$) ions from the anode chamber through a permeable membrane in the membrane plate where they react with hydroxyl ($OH^-$) ions in the cathode chamber to form sodium hydroxide (NaOH). The electrolytic cell is able to generate a preferred composition and quantity of the mixed oxidant gas using such low voltages due to the reduced electrolyte volume in the anode and cathode chambers by reason of the electrolytic cell construction comprising external anolyte and catholyte reservoirs. Additionally, the use of a continuous anolyte feed system instead of a batch-type system permits the production of an oxidant gas having a consistent proportion of the desired mixed oxidant gas species.

BRIEF DESCRIPTION OF THE DRAWINGS

These and other features and advantages of the present invention will become appreciated as the same becomes better understood with reference to the specification, claims and drawings wherein:

FIG. 10 is a perspective view of a second preferred multi-electrolytic cell comprising a number of electrolytic cells constructed according to principles of this invention.

DETAILED DESCRIPTION

An electrolytic cell provided in the practice of this invention may be used for controlling biological activity, corrosion, and scaling in large bodies of water used in industrial and/or commercial applications such as cooling towers, process water treatment, water used in food processing and the like, in recreational applications such as swimming pools, theme parks and the like, and in municipal applications such as sewage treatment and disinfecting drinking water. The electrolytic cell provides effective control of biological activity, corrosion, and scaling without the need for using supplemental chemical-type additives. The electrolytic cell does so through the electrolytic generation of an oxidant gas comprising a mixture of chlorine containing gas species that are introduced into the large body of water.

Figure 1:
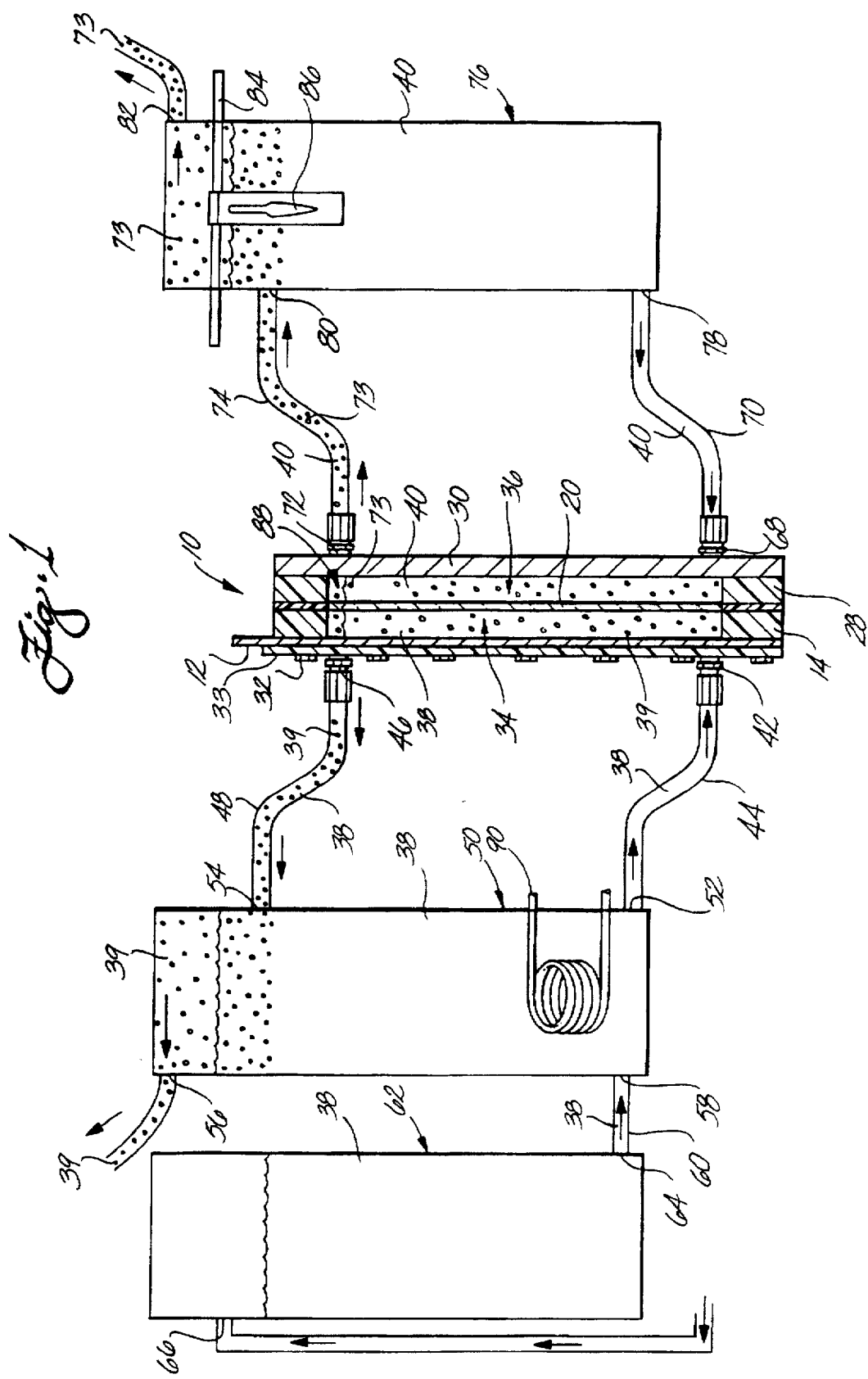
FIG. 1 is a cross-sectional semi-schematic view of a first preferred embodiment of an electrolytic cell constructed according to principles of invention.

FIG. 1 shows a first preferred embodiment of an electrolytic cell constructed according to principles of this invention. The electrolytic cell 10 comprises an anode plate 12 comprising a generally flat sheet of structurally rigid material having a plurality of bolt holes (not shown) arranged around its periphery. The anode plate may be constructed from any type of electrically conductive material that is chemically resistant to contact with the electrolyte and electrolysis products produced at the anode plate, electrochemically resistant to the action of oxidation, and mechanically rigid such so that it may serve as a structural member for containing the electrolyte in the electrolytic cell. Suitable materials for constructing the anode plate include niobium, columbium, zirconium, graphite, or titanium. A preferred anode plate may be constructed from titanium. Additionally, it is desirable that the surface of the anode plate that contacts the electrolyte solution within the cell be coated with an electrically conductive material. Suitable anode plate coatings include platinum, ruthenium, or iridium. Coating the anode plate with such materials is desired because the chemically and electrochemically resistant materials used to construct the anode plate are typically not good electrical conductors. Accordingly, such coating is desired in order to increase the electrical conductivity of the anode plate at the point of contact with the electrolyte solution. In a preferred embodiment, the anode plate is coated with ruthenium.

The anode plate may be configured in a variety of different geometric shapes such as square, rectangular, circular and the like. A preferred anode plate configuration is rectangular having a dimension of approximately 36 centimeters by 13 centimeters. The rectangular configuration is preferred because it is believed to affect the size and escape of the gas bubbles formed in the electrolytic cell chamber. An electrolytic cell chamber having a height greater than its width facilitates the formation of small gas bubbles in the electrolyte during the electrolysis reaction, minimizing the potential for an open circuit developing at the anode surface. The anode plate may have a thickness sufficient to provide a desired degree of structural rigidity to the electrolytic cell. In a preferred embodiment, the anode plate has a thickness of approximately two millimeters.

Figure 3:
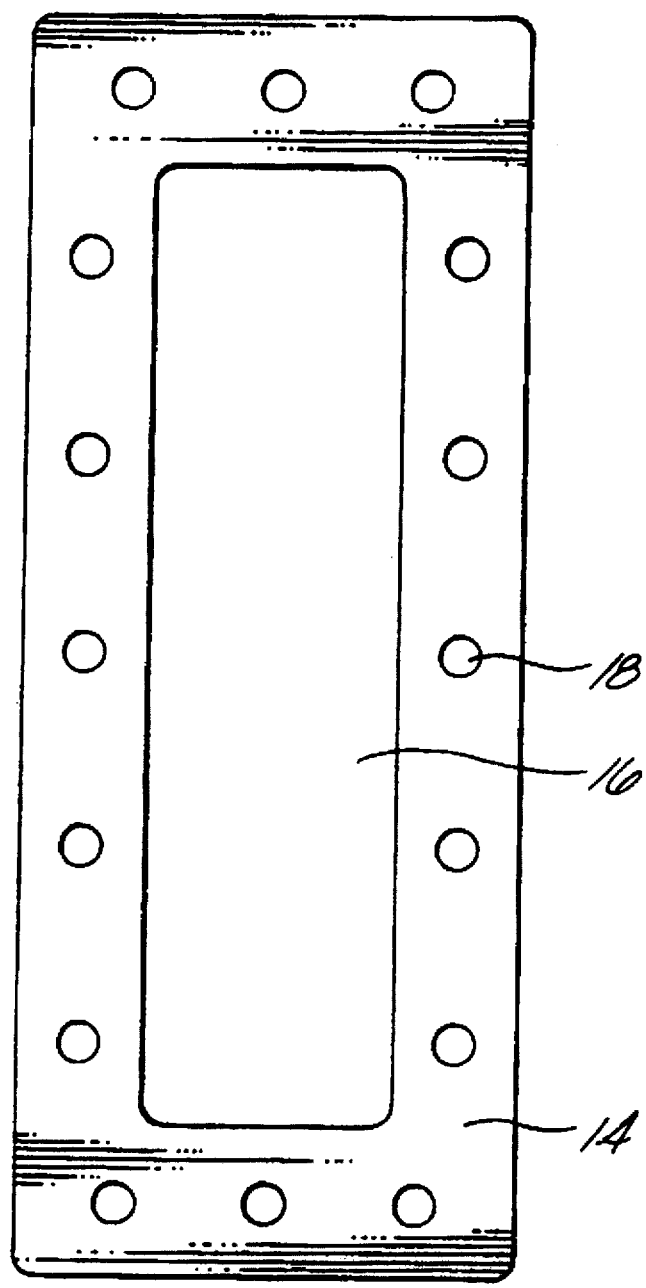
FIG. 3 is a plan view of a sealing gasket used to construct the electrolytic cell.

Moving from the anode to cathode of the cell (from left to right in FIG. 1 ), an anode sealing gasket 14 is adjacent to the surface of the anode plate 12. The sealing gasket may comprise a sheet of resilient material having an open cavity 16 at the central portion of the gasket as shown in FIG. 3. The sealing gasket comprises a plurality of bolt holes 18 extending around the peripheral portion of the anode sealing gasket arranged in a pattern corresponding to the plurality of bolt holes in the anode plate. The anode sealing gasket may be made from any type of structurally resilient material that is electrically nonconductive, heat resistant and chemically resistant. Suitable materials for constructing the anode sealing gasket include silicone rubber, chlorinated polyvinyl chloride (CPVC), Teflon and the like. In a preferred embodiment, the sealing gasket is made from schedule 80 CPVC.

Figure 2:
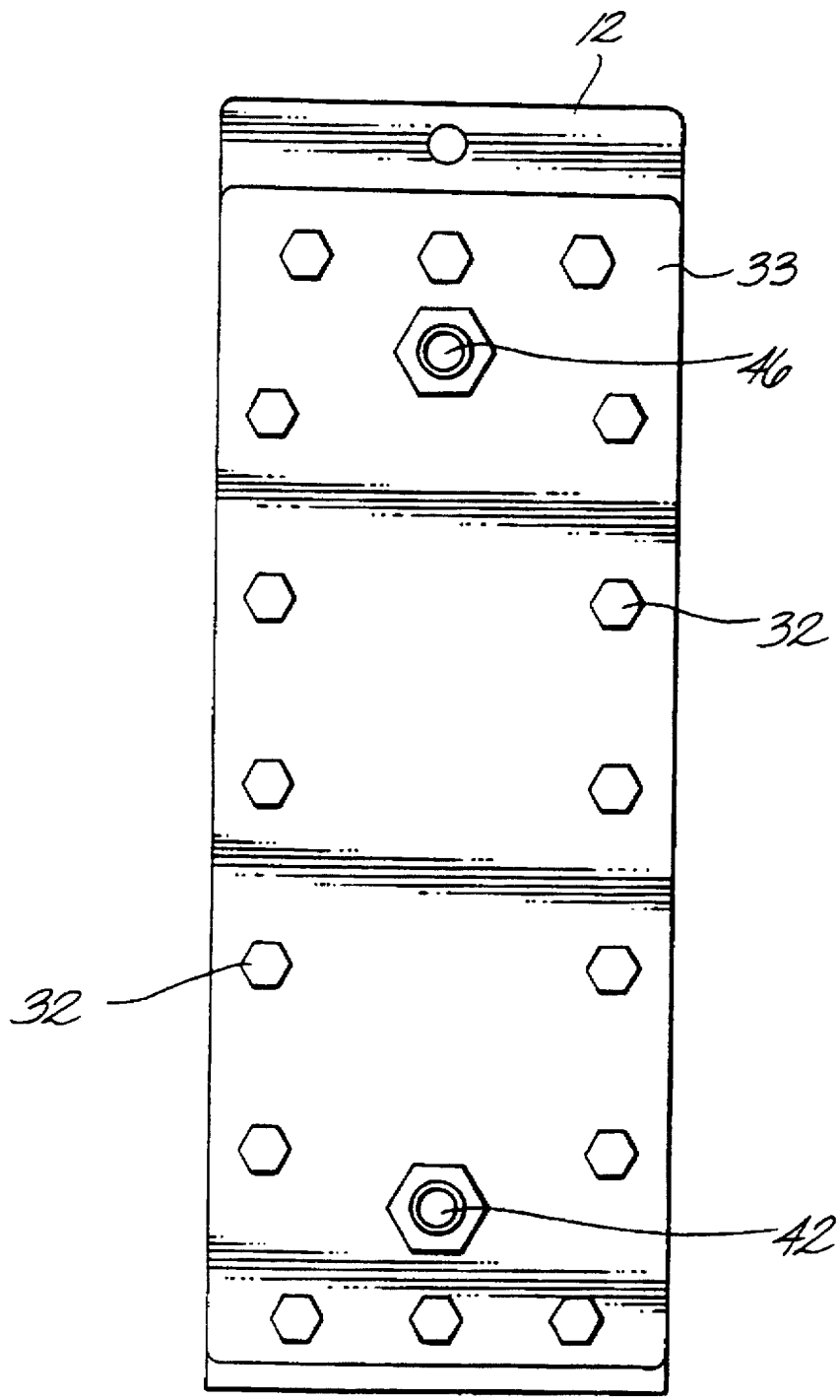
FIG. 2 is a plan view of an anode plate used in the electrolytic cell.

In order to promote effective sealing of the electrolyte within the electrolytic cell, the dimensions of the anode sealing gasket may be approximately similar to the dimensions of the anode plate. In a preferred embodiment, for a cell operating at an electrical current of approximately 40 amperes, the sealing gasket may have an outside dimension of approximately 33 centimeters by 13 centimeters and the open cavity may have dimensions of approximately 25 centimeters by 6 centimeters. It is desired that the anode sealing plate be slightly smaller in length than the anode plate to facilitate electrical connection with the upper portion of the anode plate extending from the cell, as shown in FIGS. 1 and 2.

Figure 4:
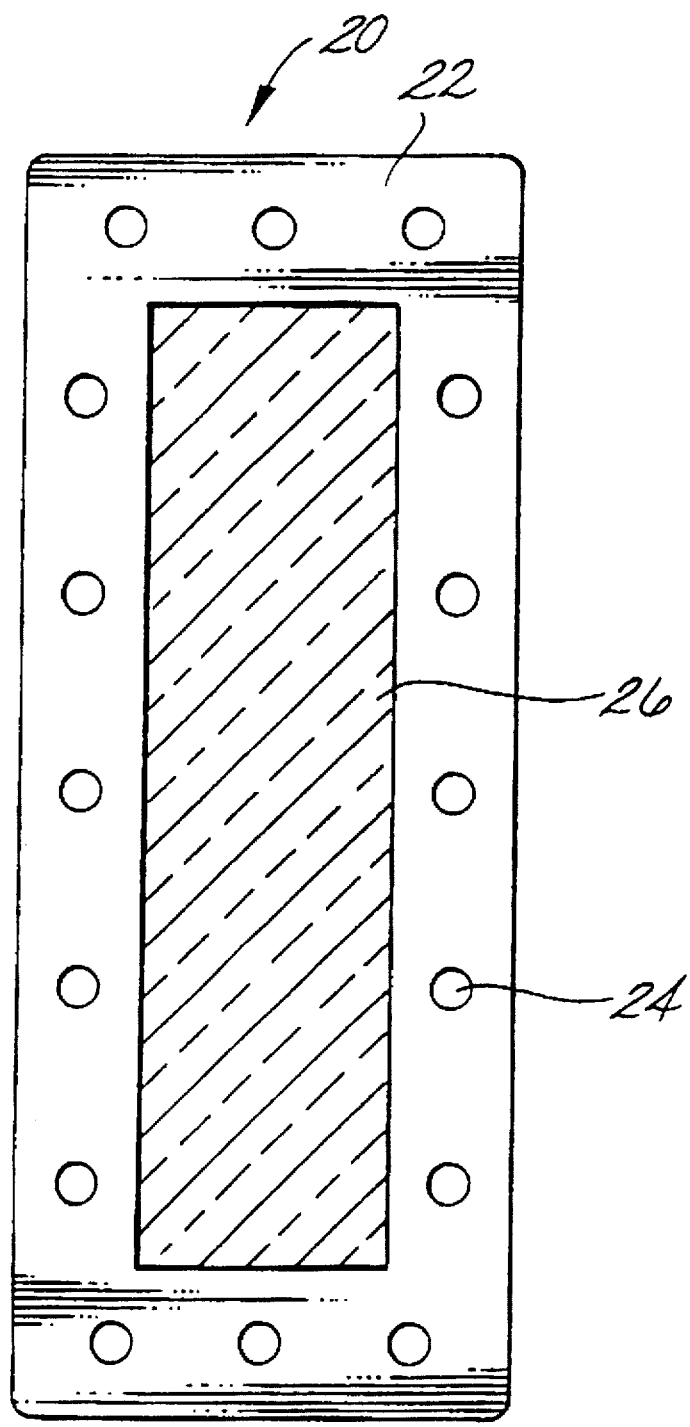
FIG. 4 is a plan view of a membrane plate comprising a permeable membrane used to construct the electrolytic cell.

A membrane plate 20 is adjacent to the surface of the anode sealing gasket 14. The membrane plate may comprise a sheet of a permeable membrane material that facilitates the transfer of cations present in the electrolyte through its surface. As shown in FIG. 4, the peripheral portion of each surface of the permeable membrane sheet may be coated with a resilient material 22 that is electrically nonconductive, heat resistant and chemically resistant, such as silicone rubber, Teflon and the like. It is desirable to coat the peripheral portion of the permeable membrane to both enhance the rigidity of the permeable membrane sheet and to provide a non-porous surface that interfaces with the anode sealing gasket to form an electrolyte-tight seal.

The membrane plate 20 may be configured having the same general shape as the anode sealing gasket 14 to provide an effective seal with the anode sealing gasket to retain the electrolyte within the electrolytic cell. A plurality of bolt holes 24 extend around the peripheral portion of the membrane plate, arranged in a pattern corresponding to the pattern of bolt holes in both the anode plate 12 and the adjacent anode sealing gasket 14. The non-coated portion of the permeable membrane 26 may correspond in size and shape to the open cavity 16 in the anode sealing gasket. Accordingly, when placed adjacent to the anode sealing gasket, the non-coated portion of the permeable membrane 26 occupies an area of the membrane plate which corresponds in size and shape to the open cavity in the adjacent anode sealing gasket. The permeable membrane may be made from a suitable material that would permit the transfer of cations, such as sodium ($Na^+$) ions and the like, through its surface in order to facilitate the electrolysis reaction producing the desired mixed oxidant gas in the electrolytic cell. Suitable permeable membranes include those made from an ion-permeable material sold under the trade name NAFION manufactured by DuPont Chemical, or a non-ionic modacrylic material marketed under the trademark KANECARON distributed by National Filter Media of Salt Lake City, Utah. In a preferred embodiment, the permeable membrane material is KANECARON. In a preferred embodiment, the sheet of permeable membrane material may have a thickness of approximately one millimeter.

A cathode sealing gasket 28 is adjacent to the surface of the membrane plate 20. The cathode sealing gasket may have a size and shape similar to that of the anode sealing gasket 14. Accordingly, for purposes of simplicity, FIG. 3 may be referred to for purposes of illustrating the cathode sealing gasket. The cathode sealing gasket comprises a sheet of resilient material having an open cavity (similar to 16 in FIG. 3) at the center of the gasket. A plurality of bolt holes (similar to 18 in FIG. 3) extend about the peripheral portion of the sealing gasket arranged in a pattern corresponding to the plurality of bolt holes 24 in the adjacent membrane plate 20. The cathode sealing gasket may be made from the same types of resilient, chemical and heat resistant materials previously described for constructing the anode sealing gasket. In a preferred embodiment, the cathode sealing gasket is made from a silicone material.

In a preferred embodiment, the cathode sealing gasket 28 is in the shape of a rectangle having both its outside dimensions and open cavity dimensions approximately equal to the outside dimensions and open cavity dimensions previously described for the anode sealing gasket 14. Accordingly, when placed adjacent to the surface of the membrane plate 20, the open cavity of the cathode sealing gasket corresponds in size and shape with the non-coated portion of the permeable membrane 26.

A cathode plate 30 is adjacent to the surface of the cathode sealing gasket 28. The cathode plate may be made from a material that is electrically conductive, chemically resistant to the electrolyte solution and electrolysis products produced within the cell, and mechanically rigid so that it can serve as a structural member to retain the electrolyte within the electrolytic cell. Because the material selected for the cathode plate need not be electrochemically resistant, the material has a sufficient degree of electrical conductivity that an electrically conductive coating is not required. Since the oxidation reaction occurs at the anode and not the cathode, it is not necessary that the material selected for the cathode plate be electrochemically inert. Suitable materials for constructing the cathode plate may include stainless steel 316L, stainless steel 317L, or 254 SMO stainless steel. In a preferred embodiment, the cathode plate may be made from type 316L stainless steel.

The cathode plate may have a variety of shapes such as square, rectangular circular and the like. It is preferred that the cathode plate be in the shape of a rectangle for the same reasons previously described for the anode plate 12. In a preferred embodiment, the cathode plate has dimensions similar to the outside dimensions of the adjoining cathode sealing gasket 28. Like the anode plate, the cathode plate comprises a plurality of bolt holes (not shown) extending around the peripheral portion of its surface arranged in a pattern corresponding to the plurality of bolt holes in the adjacent cathode sealing gasket 28. The cathode plate may have a thickness sufficient to provide a desired degree of structural rigidity to the cell. In a preferred embodiment, the cathode plate has a thickness of approximately three millimeters.

The assembly comprising the anode plate 12, anode sealing gasket 14, membrane plate 20, cathode sealing gasket 28, and cathode plate 30 form the electrolytic cell. These elements may be fastened together by using conventional fasteners such as bolts 32. As shown in FIGS. 1 and 2, an insulating plate 33 may be adjacent to the surface of the anode plate opposite the anode sealing gasket to prevent an electrical short circuit from developing between the anode plate and cathode plate via the fastening bolts. The insulating plate may comprise a sheet of electrically nonconductive material having a plurality of bolt holes (not shown) located about its periphery arranged in a pattern corresponding to the plurality of bolt holes in the anode plate. The insulating plate is sized smaller than the anode plate, having dimensions approximately equal to the outside dimensions of the anode sealing gasket. In a preferred embodiment, the insulating plate is made from polyvinyl chloride (PVC). Additionally, to prevent an electrical short circuit between the anode and cathode plate it is desirable that the fastening bolts be coated or sleeved with an electrically nonconductive material.

An anode chamber 34 is formed in the electrolytic cell by the anode plate, anode sealing gasket, and membrane plate. The anode chamber comprises a volume defined by the open cavity in the anode sealing gasket. Similarly, a cathode chamber 36 is formed in the electrolytic cell by the cathode plate, cathode sealing gasket, and membrane plate. The cathode chamber comprises a volume defined by the open cavity in the cathode sealing gasket.

The anode chamber is designed to accommodate a volume of electrolyte solution 38 that, when subjected to the passage of electricity, undergoes electrolytic reaction to produce a mixed oxidant gas 39 comprising the desired proportion of chlorine containing gas species. In a preferred embodiment, the anode chamber has a volume of approximately 100 milliliters. The electrolyte solution in the anode chamber will hereinafter be referred to as the anolyte. Similarly, the cathode chamber accommodates a volume of different electrolyte solution 40 that, when subjected to the passage of electricity, undergoes electrolytic reaction to generate hydrogen in the cathode chamber. In a preferred embodiment, the cathode chamber has a volume of approximately 100 milliliters. The electrolyte solution used in the cathode chamber will hereinafter be referred to as the catholyte. Although a n approximately volume for the anode and cathode chamber has been disclosed, it is to be understood that the volume of each chamber is dependent on the spacing between the anode and cathode plate which, as will be described below, may vary.

A suitable anolyte may comprise any water-soluble chloride salt such as sodium chloride (NaCl), potassium chloride (KCl), lithium chloride (LiCl), rubidium chloride (RbCl), cesium chloride (CsCl), ammonium chloride ($NH_4Cl$), magnesium chloride ($MgCl_2$), calcium chloride ($CaCl_2$) and the like. A suitable anolyte may also comprise a chlorite salt such as sodium chlorite ($NaClO_2$) either alone or in addition to a water-soluble chloride salts. It may be desirable for the anolyte to comprise an amount of chlorite salt because the electrolytic generation of the chloride dioxide gas ($ClO_2$) does not occur until chlorite ion ($ClO2^-$) is present in the anolyte. In a preferred embodiment, the anolyte comprises sodium chloride (NACl). To facilitate the electrolytic reaction occurring in the anode chamber, the catholyte selected should readily undergo electrolytic reaction such that its electrolysis products readily combine with electrolysis products of the anolyte and, thus drive the reaction in the anode chamber forming the mixed oxidant gas 39 to completion. In a preferred embodiment, the catholyte comprises sodium hydroxide (NaOH) which is formed as a reaction product between hydroxyl ions ($OH^-$), formed via electrolysis of water molecules in the cathode chamber and sodium ions ($Na^+$) formed via electrolysis of NaCl in the anode chamber. Accordingly, the catholyte may originally be water but upon operation of the cell quickly undergoes electrolysis and reacts to form the hydroxide analog of the particular anolyte selected.

To minimize the internal resistance of the electrolytic cell associated with transferring electricity through the anolyte and catholyte volume it is desired that the anode plate and cathode plate be spaced closely together. To achieve minimum internal electrical resistance the anode and cathode plate may be spaced apart a distance in the range of from six millimeters to seven centimeters. As discussed below, spacing the anode and cathode plate apart within this range also facilitates the circulation of anolyte and catholyte within the respective anode and cathode chambers. The desired spacing may be achieved by choosing the thickness of the anode and cathode sealing gaskets. In a preferred embodiment, the anode and cathode plates are spaced apart a distance of approximately thirteen millimeters. In such an embodiment, the anode and cathode sealing gasket would each have a thickness of approximately 6.5 millimeters.

An anolyte inlet 42 is located near the lower end of the anode plate extending through the anode plate and into the anode chamber, as shown near the bottom of FIGS. 1 and 2. The anolyte inlet can be attached to the anode plate by conventional means such as by threaded connection, welded connection and the like. The anode inlet comprises a threaded fitting to accommodate threadable connection with an anolyte transfer tube 44. The anolyte inlet is located a sufficient distance from the end of the anode plate so that it is not obstructed by the anode sealing gasket 14 for transfer of the anolyte into the anode chamber.

A mixed gas and anolyte outlet 46 is positioned at the upper end of the anode plate and extends through the anode plate and into the anode chamber, as shown near the top of FIGS. 1 and 2. Like the anolyte inlet, the anolyte outlet may be attached to the anolyte plate by the conventional connection means disclosed above. The mixed gas outlet comprises a threaded fitting for threadable connection with a mixed gas transfer tube 48.

An anolyte reservoir 50 comprises a sealed container external to the anode chamber accommodating a predetermined volume of anolyte. The anolyte reservoir supplies anolyte to the anode chamber and receives both mixed oxidant gas generated in the anode chamber and anolyte circulated through the anode chamber. The anolyte reservoir and the anode chamber may be configured so that the ratio of anolyte in the anolyte reservoir to the anolyte in the anode chamber is in the range of from 5,000:1 to 1:1. In a first preferred embodiment, the anolyte reservoir has a volume of approximately one liter. Accordingly, in a first preferred embodiment, the ratio of the anolyte in the anolyte reservoir to the anolyte in the anode chamber is approximately 10:1.

The anolyte reservoir comprise an anolyte outlet 52 located at the lower end of the reservoir that is at all times flooded with the anolyte. The anolyte outlet is connected to the anolyte transfer tube 44 connected to the anolyte inlet 42 of the anode plate.

The anolyte reservoir comprises a mixed gas and anolyte inlet 54 at its upper end that is connected to the mixed gas transfer tube 48 connected to the mixed gas outlet 46 of the anode plate. The mixed gas inlet is positioned a sufficient distance from the top of the anolyte reservoir that it is below the liquid level of the anolyte in the anolyte reservoir. It is desirable to place the mixed gas inlet below the level of the anolyte to facilitate both mixed oxidant gas recovery from, and anolyte circulation through, the anode chamber. Accordingly, the mixed gas enters the anolyte within the anolyte reservoir in a two-phase stream where the gas is allowed to separate from the liquid phase before exiting the reservoir via an anolyte reservoir gas outlet 56.

The anolyte reservoir 50 comprises an anolyte feed inlet 58 near the bottom. The anolyte feed inlet is connected to an anolyte feed inlet tube 60 extending from and hydraulically connected to an anolyte make-up tank 62. The anolyte make-up tank comprises a closed container that is used to prepare and store the anolyte solution. The anolyte feed inlet tube is connected to an anolyte discharge outlet 64 positioned at the bottom of the anolyte make-up tank. The anolyte solution is prepared by opening the container and inserting a predetermined amount of the desired water-soluble chloride material, i.e., NaCl. The anolyte make-up tank comprises a fresh water inlet 66 positioned near the top of the anolyte make-up tank that is connected to a fresh water source. If desired, a level control can be installed to control the delivery of water into the make-up tank to maintain a constant liquid level of anolyte solution therein. The water-soluble chloride is dissolved into solution by introducing fresh water into the anolyte make-up tank. It is desired that the anolyte solution contained within the anolyte make-up tank be saturated. The specific gravity of a saturated NaCl is approximately 1.19 to 1.20.

It has been discovered that the desired proportion of $Cl_2$ and $ClO_2$ gas making up the mixed oxidant gas can be obtained when the NaCl anolyte in the anode chamber has a specific gravity of approximately 1.1, i.e., is not saturated. The difference between the specific gravity of the anolyte in the anolyte make-up tank and the anolyte reservoir is sufficient to cause gravity feeding of the anolyte solution from the anolyte make-up tank to the anolyte reservoir, via the anolyte feed inlet tube. The difference in specific gravity is sufficient to effect gravity feeding without need for increasing the pressure head of the anolyte in the anolyte make-up tank by either maintaining an anolyte level above the anolyte level in the anolyte reservoir or raising the anolyte make-up tank above the anolyte reservoir.

It has also been discovered that the production of desired proportion of $Cl_2$ and $ClO_2$ gas occurs when there is observed conversion of the chloride ions ($Cl^-$) in the anolyte to chlorite ion ($ClO_2_-$), which is the precursor to $ClO_2$ gas. Accordingly, when the $ClO_2$ gas is generated, chlorite ion (ClO2⁻) is present in the anolyte. The presence of ClO2⁻ ion in the anolyte as evidence of $ClO_2$ gas generation will be discussed in detail below.

It is desired to feed saturated NaCl solution to the anolyte reservoir to maintain the specific gravity of the NaCl solution in both the anolyte reservoir and anode chamber. As the electrolytic reaction proceeds in the anode chamber, the specific gravity of the anolyte contained within the anode chamber decreases due to production of $Cl_2$ gas, and the liberation of Na+ ions and their migration across the permeable membrane to the cathode chamber. The specific gravity of the anolyte in the anode chamber is maintained within the predetermined range by continuously introducing saturated NaCl anolyte solution from the anolyte make-up tank into the anolyte reservoir. The saturated NaCl entering the anolyte reservoir serves to recharge or boost the specific gravity of the anolyte in the anolyte reservoir to the desired level for generating the preferred composition of the mixed oxidant gas.

A catholyte inlet 68 is positioned near the bottom of the cathode plate extending through the cathode plate to the cathode chamber. Like the anolyte inlet, the catholyte inlet can be attached to the cathode plate by use of the conventional connection means described above. The catholyte inlet port is threaded to accommodate threadable connection with a catholyte feed tube 70. A gas and catholyte outlet 72 is near the top of the cathode plate extending through the cathode plate and into the cathode chamber. The gas and catholyte outlet can be attached to the cathode by use of the same conventional connection means described above for the gas and anolyte outlet. The gas outlet port allows for both the circulation of catholyte through the cathode chamber and the free discharge of gases 73 generated in the cathode chamber from the electrolytic cell. The gas outlet is threaded to accommodate threadable connection with a gas transfer tube 74.

The catholyte is stored in a catholyte reservoir 76. The catholyte reservoir comprises a sealed container accommodating a volume of the catholyte. The catholyte reservoir and the cathode chamber may be configured so that the ratio of catholyte in the catholyte reservoir to the catholyte in the cathode chamber is in the range of from 5,000:1 to 1:1. In a first preferred embodiment, the catholyte reservoir has a volume of approximately one liter. Accordingly, in a first preferred embodiment, the ratio of the catholyte in the catholyte reservoir to the catholyte in the cathode chamber is approximately 10:1.

The catholyte reservoir comprises a catholyte outlet 78 near the bottom of the reservoir that is always flooded with the catholyte. The catholyte outlet port is threaded for connection with the catholyte feed tube 70 connected to the cathode plate 30. The catholyte reservoir comprises a gas and catholyte inlet 80 near its upper end. The gas inlet is threaded for connection with the gas transfer tube 74 connected to the cathode plate 30. In a preferred embodiment, the gas inlet is located a sufficient distance from the end of the catholyte reservoir that it is below the liquid level of the catholyte in the reservoir. It is desirable to place the gas inlet below the level of the catholyte to facilitate both gas recovery from, and catholyte circulation through, the cathode chamber. The catholyte from the cathode chamber enters the catholyte reservoir in a two-phase stream where the gas is allowed to separate from the liquid phase before exiting the reservoir via a catholyte reservoir gas outlet 82 at the top of the catholyte reservoir.

In a preferred embodiment, the NaOH solution contained within the catholyte reservoir has a specific gravity in the range of from about 1.05 to 1.13. A catholyte having a specific gravity in this range, when introduced to the cathode chamber, has been shown to promote an optimum degree of $Na^+$ ion transfer from the anode chamber, through the permeable membrane 26 and into the cathode chamber. The transfer of $Na^+$ ions from the anode chamber into the cathode chamber promotes the optimum rate of mixed oxidant gas, i.e., the electrolysis reaction in the anode chamber is driven to completion by the removal of the $Na^+$ ions from the anode chamber. A catholyte having a specific gravity of less than about 1.05 provides a concentration gradient across the permeable membrane 26 greater than that required to effect the selected transfer of $Na^+$ ions through the permeable membrane 26. Rather, the large concentration gradient produced by using a catholyte having a specific gravity of less than about 1.05 will result in the transfer of the anolyte ions, i.e., NaCl, through the membrane, reducing the amount of mixed oxidant gas generated in the anode chamber. A catholyte having a specific gravity of greater than about 1.13 will not create the desired concentration gradient across the permeable membrane to effect transfer of $Na^+$ ions from the anode chamber through the membrane, also reducing the amount of mixed oxidant gas generated at the anode chamber.

As the NaOH catholyte from the catholyte reservoir enters the cathode chamber, the water molecules present in the solution undergo electrolysis generating $H_2$ gas and $OH^-$ ions. The $OH^-$ ions and the $Na^+$ ions, transferred from the anode chamber through the permeable membrane, circulate through the cathode chamber and into the catholyte reservoir via the gas transport tube 74. Accordingly, during the operation of the electrolytic cell the concentration of $Na^+$ and $OH^-$ ions within the catholyte reservoir increases, increasing the specific gravity of the catholyte. To maintain the desired specific gravity of the catholyte in both the cathode chamber and the catholyte reservoir, the catholyte reservoir comprises a fresh water inlet 84 for diluting the catholyte by the addition of water and a catholyte blowdown outlet (not shown) for maintaining the desired catholyte level and ridding the catholyte reservoir of excess $Na^+$ ion.

The catholyte reservoir may also comprise a water regulating means for regulating the amount of water entering the reservoir based on the particular specific gravity of the catholyte. The water regulating means may comprise a hydrometer operated switch, such as a magnetic reed switch, a hall effect transducer, a visual-type ultra-violet detector and the like. In the first preferred embodiment the water regulating means comprises a hydrometer 86 that, upon the specific gravity of the catholyte rising above 1.13, rises to a level triggering a mechanism discharging water from the fresh water inlet 84 into the catholyte reservoir. As the fresh water enters the catholyte reservoir and the catholyte level rises, excess $Na^+$ ions are purged from the reservoir via the catholyte blow-down outlet. Once the specific gravity of the catholyte approaches the desired specific gravity range, the hydrometer lowers, shutting off the discharge of water into the reservoir. This is but one embodiment of a means for regulating the specific gravity of the catholyte in the catholyte reservoir. Accordingly, it is understood to be within the scope of this invention that other means for regulating the specific gravity of the catholyte may also be used.

The electrolytic cell constructed according to principles of this invention produces a mixed oxidant gas comprising $Cl_2$ and $ClO_2$ in the anode chamber by applying a voltage differential in the range of from three to ten volts between the anode plate and cathode plate. The relatively small volume of anolyte and catholyte contained within the respective anode and cathode chambers (approximately 100 milliliters in each chamber), results in the electrolytic cell having a relatively low internal resistance. This reduced internal resistance, in turn, allows the cell to operate using only slightly more voltage than is necessary to effect the desired electrolytic reactions in the anode and cathode chambers.

Figure 5:
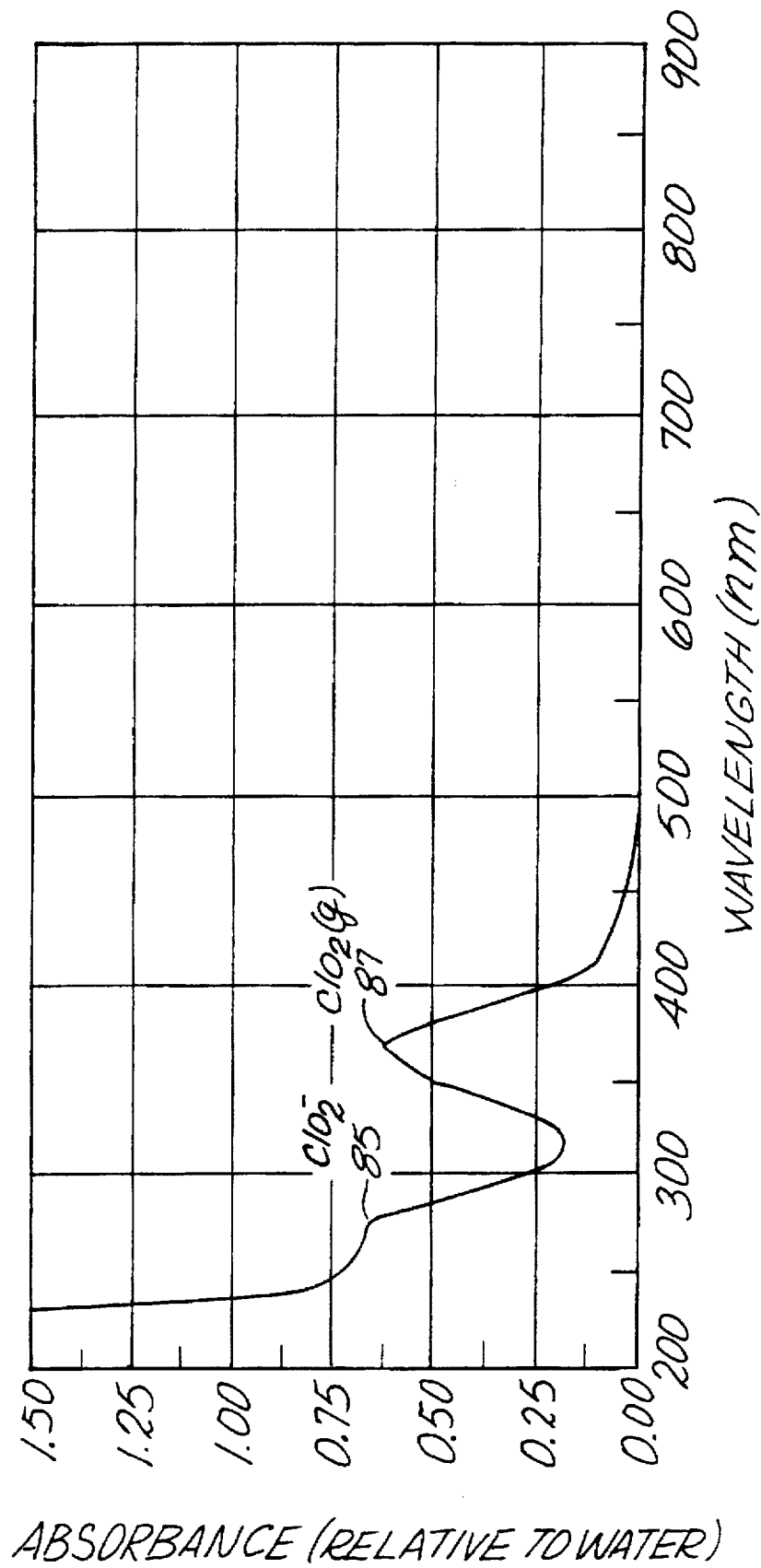
FIG. 5 is a graph illustrating an ultra-violet spectrophotometric analysis of an anolyte solution circulated within an electrolytic cell operating at steady state conditions.

In the anode chamber, the NaCl is believed to undergo a number of different electrolytic reactions depending on the particular voltage applied across the anode and cathode. While not wishing to be bound by any particular theory or mechanism, the NaCl in the anode chamber is believed to undergo electrolysis to form primarily $Cl_2$ and $ClO_2$ through a series of competing electrolytic reactions. One characteristic of the reactions is the presence of $ClO_2^-$ ion in the anolyte generated by the series of the competing electrolytic reactions. FIG. 5 illustrates an ultra-violet spectrophotometric analysis of the anolyte circulated through the anode chamber when the electrolytic cell constructed according to principles of this invention is operating at steady state, i.e., after approximately five minutes of operation at an applied voltage of approximately six volts and a current of approximately 40 amperes. In FIG. 5, The presence of $ClO_2^-$ ion is indicated by an absorbance peak 85 at the wavelength of approximately 260 nanometers, the characteristic ultra-violet wavelength for ClO2– being approximately 260 nanometers. Additionally, FIG. 4 also illustrates the presence of $ClO_2$ gas in the anolyte as indicated by an absorbance peak 87 at the wavelength of approximately 375 nanometers, the characteristic ultra-violet wavelength for $ClO_2$ gas being approximately 375 nanometers.

A preferred ratio of $ClO_2$ to $Cl_2$ in the mixed oxidant gas is approximately two to one. This ratio of $ClO_2$ to $Cl_2$ is desired because it has been found that a mixed oxidant gas having such ratio produces more $ClO_2^-$ and $ClO_3^-$ ions in the body of water that the gas is injected into, which serves to capture more calcium (Ca) ions in the water to reduce scaling. Additionally, $ClO_2$ gas has the advantage of being a longer lasting oxidant than $Cl_2$ gas. Although not as strong an oxidizing agent as hypochlorite (OCl–), $ClO_2$ is a moderate oxidizer that is beneficial because it is both safer to handle and is not harmful to equipment that it may contact, such as piping, pumps, heat exchangers, and the like.

According to electrochemical principles, the NaCl solution is believed to first undergo electrolysis at a low voltage to form $Na^+$ ions and $Cl^-$ ions. The $Na^+$ ions travel from the anode chamber through the non-coated portion of the permeable membrane 26 and enter the cathode chamber. With increasing voltage, the $Cl^-$ ions combine with other $Cl^-$ ions to form the desired $Cl_2$ gas. With increasing voltage applied between the anode and cathode plate the $Cl_2$ gas reacts with $H_2O$ molecules in the anolyte to form HClO. With further increasing voltage the HClO reacts with $H_2O$ molecules in the anolyte to form $HClO_2$. The amount of voltage necessary to achieve this last reaction is obtained by applying a voltage differential across the anode plate and cathode plate in the range of from about three to ten volts. Once the $HClO_2$ has been formed it reacts almost instantaneously to form the desired $ClO_2$ gas, since the voltage necessary to effect the electrolysis reaction forming the $ClO_2$ gas from the chlorite component of the $HClO_2$ is much lower than that necessary to form $HClO_2$.

These electrochemical principles are well supported by the operation of the electrolytic cell constructed according to principles of invention since. As shown in FIG. 5, during steady state operation the anolyte circulated through the anode chamber of the electrolytic cell is known to comprise both $ClO_2$ gas and $ClO_2^-$ ion, the precursor for $ClO_2$ gas. Additionally, the proportion of $ClO_2$ gas to $Cl_2$ gas produced by the cell is known to increase as the voltage applied between the anode plate and the cathode plate is increased. Accordingly, if desired one could vary or regulate the desired proportion of $ClO_2$ gas to $Cl_2$ gas by varying the voltage applied between the anode and cathode plate.

In determining the desired range for the voltage applied between the anode plate and cathode plate it was determined that the voltage should not be so high as to produce, via electrolysis of $H_2O$, $H_2O_2$ or $O_3$ since both of these molecules interfere with the production of $ClO_2$ gas. It was discovered that the minimum voltage applied between the anode plate and cathode plate that would result in production of $ClO_2$ gas is greater than approximately 4.25 volts, with $ClO_2$ gas being the predominate gas produced in the anode chamber at approximately 6.25 volts.

The NaOH solution entering the cathode chamber is believed to undergo a series of electrolysis reactions whereby the $H_2O$ molecules of the catholyte form $OH^-$ ions and $H_2$ gas. Therefore, to drive the electrolytic reactions in the anode chamber to completion, the electrolytic reaction in the cathode chamber must also be driven to completion. Because of the stoichiometry of the electrolysis reaction at the cathode, as much as five to six times more $H_2$ gas is created in the cathode chamber than the amount of mixed oxidant gas created in the anode chamber. Accordingly, to drive the electrolytic reactions in both the anode and cathode chamber to completion, a need exists to transport the $H_2$ gas from the cathode chamber as efficiently as possible.

The generation of $H_2$ gas in the cathode chamber causes bubbles to form in the catholyte volume during the operation of the electrolytic cell. As the bubbles are formed, they migrate through the catholyte, into a vapor space 88 in the cathode chamber, as shown in the top portion of FIG. 1. In order to promote the efficient collection of $H_2$ gas in the cathode chamber, the top portion of the open cavity in the cathode sealing gasket defining the vapor space may be convex. It is believed that a vapor space having a generally triangular top promotes the collection and transfer of $H_2$ gas from the cathode chamber.

Additionally, the diameter of the gas and catholyte outlet 72 and the gas transfer tube 74 may also be selected to both promote the efficient removal of the $H_2$ gas from the cathode chamber and control the size of the $H_2$ gas bubbles. A small positive pressure maintained on the cathode chamber is desired because it promotes the formation of small $H_2$ gas bubbles, thereby minimizing the potential for an open circuit developing at the cathode surface.

The $H_2$ transferred to the catholyte reservoir is swept from the reservoir via the gas outlet 82 and may be vented to the atmosphere or collected, stored and sold. To promote efficient electrolysis in the cathode chamber it is desired that the $H_2$ gas be removed from the catholyte reservoir at a rate sufficient to maintain the migration of the $H_2$bubbles through the cathode chamber. In a preferred embodiment, it is desirable that the rate of $H_2$ gas removal not exceed the rate of $H_2$ gas generation so that a small amount of positive pressure is maintained in the cathode chamber to control bubble size.

The catholyte in the catholyte reservoir 76 may be fed to the cathode chamber by a variety of transport means such as by gravity feed, pump and the like. In a first preferred embodiment, the catholyte is fed by gravity. To ensure catholyte flow into the cathode chamber the catholyte level in the catholyte reservoir is higher than the catholyte level in the cathode chamber. A sufficient hydraulic head difference between the catholyte in the catholyte reservoir and the catholyte in the cathode chamber can be obtained by raising the catholyte reservoir above the electrolytic cell, as shown in FIG. 1. In a first preferred embodiment, a height difference of at least twenty-five millimeters is sufficient to provide the desired hydraulic head difference.

The catholyte may be continuously circulated through the cathode chamber by the migration of $H_2$ gas bubbles (formed by electrolysis in the cathode chamber) upwards through the volume of the catholyte serving as a type of "catholyte lift," inducing the upwards circulation of the catholyte. To maximize the ability of the migrating $H_2$ gas bubbles to cause the circulation of the catholyte through the cathode chamber it is desired that the cathode plate be positioned close to the membrane plate 20, and therefore close to the opposing anode plate. A desired degree of catholyte circulation is achieved when the cathode plate and the anode plate are placed apart within the range of distances previously described.

The anolyte in the anolyte reservoir 50 may be fed to the anode chamber by a variety of transport means such as by gravity feed, pump and the like. In a preferred embodiment, the anolyte in the anolyte reservoir is fed to the anode chamber by gravity. To ensure anolyte flow into the anode chamber the anolyte level in the anolyte reservoir is higher than that of the liquid level in the anode chamber. A sufficient hydraulic head difference between the anolyte in the anolyte reservoir and the anolyte in the anode chamber can be obtained by raising the anolyte reservoir above the electrolytic cell, as shown in FIG. 1. In a first preferred embodiment, a height difference of at least twenty-five millimeters is sufficient to provide the desired hydraulic head difference.

The anolyte may be continuously circulated through the anode chamber by the migration of $Cl_2$ and $ClO_2$ gas bubbles (formed by electrolysis in the anode chamber) upwards through the volume of the anolyte serving as a type of "anolyte lift," inducing the upwards circulation of the anolyte. To maximize the ability of the migrating $Cl_2$ and $ClO_2$ gas bubbles to cause the circulation of the anolyte through the anode chamber it is desired that the anode plate be positioned close to the membrane plate, and therefore close to the opposing cathode plate. A desired degree of anolyte circulation is achieved when the anode plate and cathode plate are placed apart within the range of distances previously described. Additionally, the anolyte is circulated through the anode chamber by thermal convention via the release of thermal energy from the electrolysis reactions occurring in the anode chamber.

The mixed oxidant gas transferred to the anolyte reservoir from the anode chamber migrates through the anolyte and is collected in the head space of the anolyte reservoir. The collected gas is swept from the anolyte reservoir, via the mixed gas outlet 56, for introduction into the body of water to be treated. In a preferred embodiment, the mixed gas outlet 56 is connected by tubing to a venturi (not shown) mounted in the circulation piping for the water requiring treatment. The mixed oxidant gas enters the water by circulating the water through the venturi, causing the mixed oxidant gas to be swept from the anolyte reservoir and injected into the water. Constructed in this manner, the electrolytic cell may be used to inject the mixed oxidant gas into circulation system of the water requiring treatment for maintaining a level of mixed oxidant gas to provide the desired degree of protection against biological activity, corrosion, and scaling.

It is desired that mixed oxidant gas be removed from the anolyte reservoir at a rate slower than the rate at which the mixed oxidant gas is generated to maintain a small positive pressure in the anode chamber. Maintaining a small positive pressure in the anode chamber serves to promote the formation of small gas bubbles at the anode, minimizing the potential for an open circuit developing at the anode surface.

The electrolytic reaction occurring in the anode chamber is known to release a large amount of heat. This heat is ultimately transferred to the anode plate and the anolyte which, if not removed, may eventually cause the anolyte to boil. The boiling of the anolyte is not desired because the formation of gas bubbles in the anolyte effectively reduces the degree of contact between the anode plate and the anolyte, decreasing the efficiency of the electrolytic cell. The heat generated in the anode chamber may be removed by using a variety of well known thermal management devices such as a heat sink, e.g., mounted to the surface of the anode plate, a heat exchanger, e.g., mounted in-line with the anolyte circulation stream between the anode chamber and the anolyte reservoir, and the like. In a preferred embodiment, the heat generated in the anode chamber is controlled by routing a cooling water line 90 into and through the anolyte reservoir for cooling the anolyte entering the anode chamber, as shown in FIG. 1.

In a first preferred embodiment, a voltage of approximately six volts is sufficient to provide a desired current of from about 15 to 50 amps through the cell. It has been found that an electrolytic cell with the dimensions described above and operated at approximately 40 amps, generates a sufficient amount of mixed oxidant gas to effectively control biological activity, corrosion, and scaling in industrial water applications equivalent to a 1500 ton cooling tower.

After the predetermined voltage is applied between the anode and cathode plates the electrolysis reactions begin in both the anode and cathode chamber. It has been found that the desired rate and proportion of $Cl_2$ and $ClO_2$ gas is generated in the anode chamber after approximately five minutes, reflecting the time for the electrochemical system to achieve equilibrium. The ability to achieve equilibrium after only a relatively short period is due to the construction of the electrolytic cell, i.e., the small working electrolyte volume in the anode and cathode chambers.

The time for achieving equilibrium may be reduced by preserving the equilibrium state of the anolyte and catholyte in the anode and cathode chamber, respectively, after the electrolytic cell has been shut off. If desired, the equilibrium state of the anolyte and catholyte may be preserved by installing valves (not shown) in both the mixed gas transfer tube 48 and the gas transfer tube 74. By closing these valves after the operation of the electrolytic cell, the mixed oxidant gas and the $H_2$ gas are retained within the respective cathode and anode chamber. Retaining the gases within each chamber serves to decrease the time needed to achieve equilibrium because the desired gas species are already present. Alternatively, such valves may be installed in the anolyte reservoir gas outlet 56 and the gas outlet 82 to yield similar results. By using such valves, the time necessary to achieve equilibrium upon start up may be decreased by as much as 75 percent.

The electrolyte cell having an anolyte and catholyte reservoir external to the respective anode and cathode chamber has several distinct advantages over electrolytic cells comprising integral reservoirs and chambers. The use of external electrolyte reservoirs permits the construction of an electrolytic cell having an anode and cathode chamber of reduced electrolyte volume, reducing the internal resistance of the electrolytic cell and increasing the electrical efficiency of the electrolytic cell. The use of external electrolyte reservoirs facilitates convenient maintenance and service of the electrolytic cell because the cell is both smaller and less complicated to work with. The use of external electrolyte reservoirs allows for the mixed oxidant gas to be drawn from the anolyte reservoir, and not the anode chamber where it is desirable that the equilibrium state not be upset, in order to promote efficient mixed oxidant gas generation. Accordingly, the external anolyte reservoir acts as a type of buffer, minimizing potential equilibrium upsets in the anode chamber.

Because of their large volume relative to the respective anode and cathode chambers, the anolyte and catholyte reservoirs act as a buffer to minimize specific gravity swings from occurring within each chamber. The approximately 10:1 volume difference, for the first preferred embodiment, between each reservoir and its respective cell chamber serves to buffer the electrolyte entering each cell chamber from the effects of the electrolytic process occurring in each chamber. Accordingly, using the external anolyte and catholyte reservoir allows each cell chamber to receive electrolyte having a constant predetermined composition, optimizing the ability of the cell to generate the desired composition and quantity of mixed oxidant gas.

Figure 6:
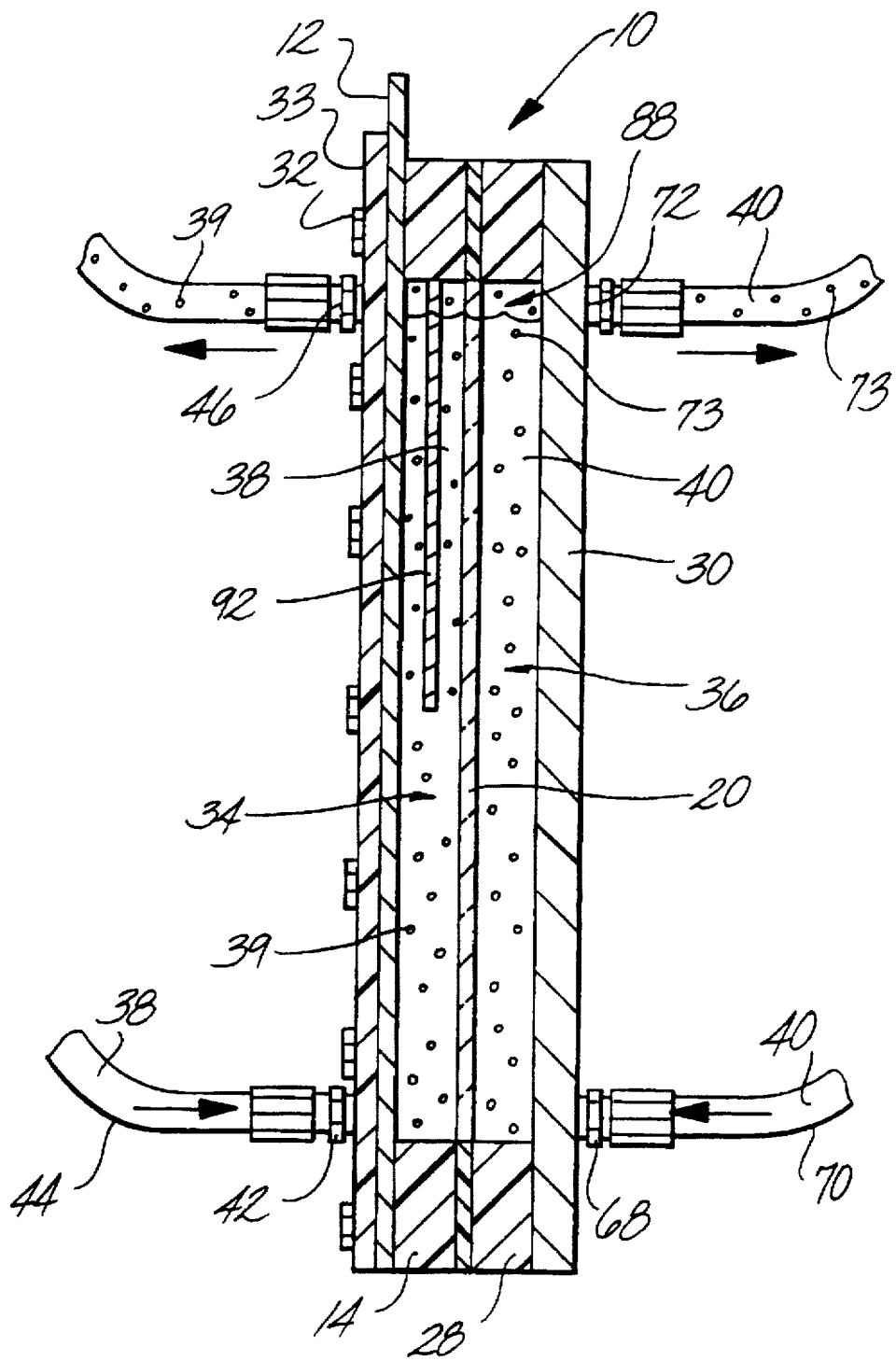
FIG. 6 is a cross-sectional semi-schematic view of an embodiment of the electrolytic cell comprising a bipolar electrode.

Although limited embodiments of the electrolytic cell have been described herein, many modifications and variations will be apparent to those skilled in the art. For example, it is to be understood within the scope of invention that the electrolytic cell may be constructed incorporating the use of a bipolar electrode. FIG. 6 illustrates an embodiment of an electrolytic cell comprising a bipolar electrode 92 interposed between the anode plate 14 and the membrane plate 20. In such an embodiment the bipolar electrode may be used to improve the yield of the desired proportion of $ClO_2$ and $Cl_2$ gas via electrolysis in the anode chamber.

The bipolar electrode may be made from a structurally rigid material that is both chemically resistant to the anolyte and electrochemically resistant to the electrolysis reactions occurring in the anode chamber. Additionally, it is desirable that the bipolar electrode comprise a plurality of openings through its surface to facilitate the circulation of the anolyte through the anode chamber. It is desirable that both sides of the bipolar electrode comprise an electrically conductive coating to promote the desired electrolysis reactions in the anode chamber. Suitable conductive coatings include the same types of materials previously described for coating the anode plate. In a preferred embodiment, incorporating the use of a bipolar electrode, a bipolar electrode is made from expanded titanium and coated with an iridium material produced by Eltech of Chardon, Ohio, under the product name EC600.

Figure 7:
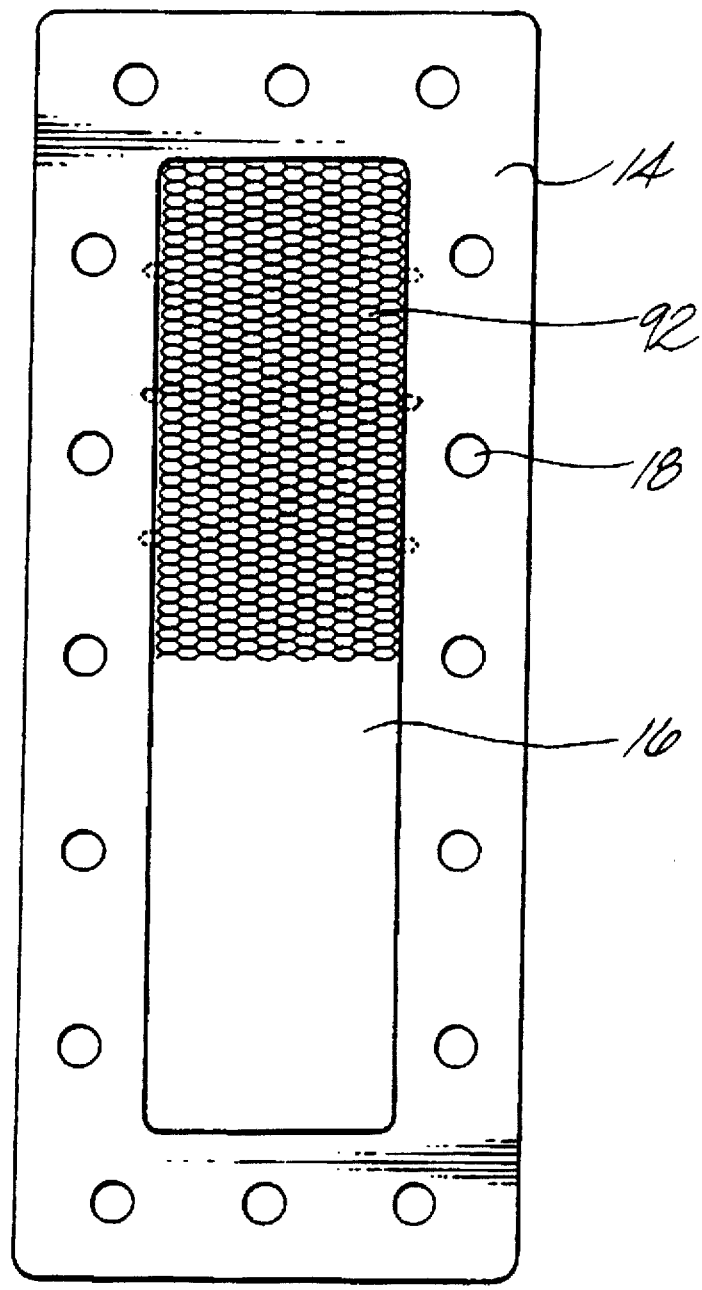
FIG. 7 is a plan view of an embodiment of the sealing gasket comprising a bipolar electrode.

FIG. 7 illustrates an embodiment of the anode sealing gasket 14 previously described comprising a bipolar electrode 92 extending across a portion of the open cavity 16. The bipolar electrode may be retained within the open cavity of the anode sealing gasket by a tongue and groove arrangement or the like. The bipolar electrode may extend across and cover the entire open cavity 16 or may only partially extend across the open cavity. It has been discovered that the optimum production of the desired mixed oxidant gas is obtained by installing the bipolar electrode in the top half of the anode sealing gasket, as shown in FIG. 7. It is to be understood that the embodiment of the anode sealing gasket plate illustrated in FIG. 7 is similar in all respects to the anode sealing gasket previously described and illustrated in FIG. 3 except for the installation of the bipolar electrode.

Figure 8:
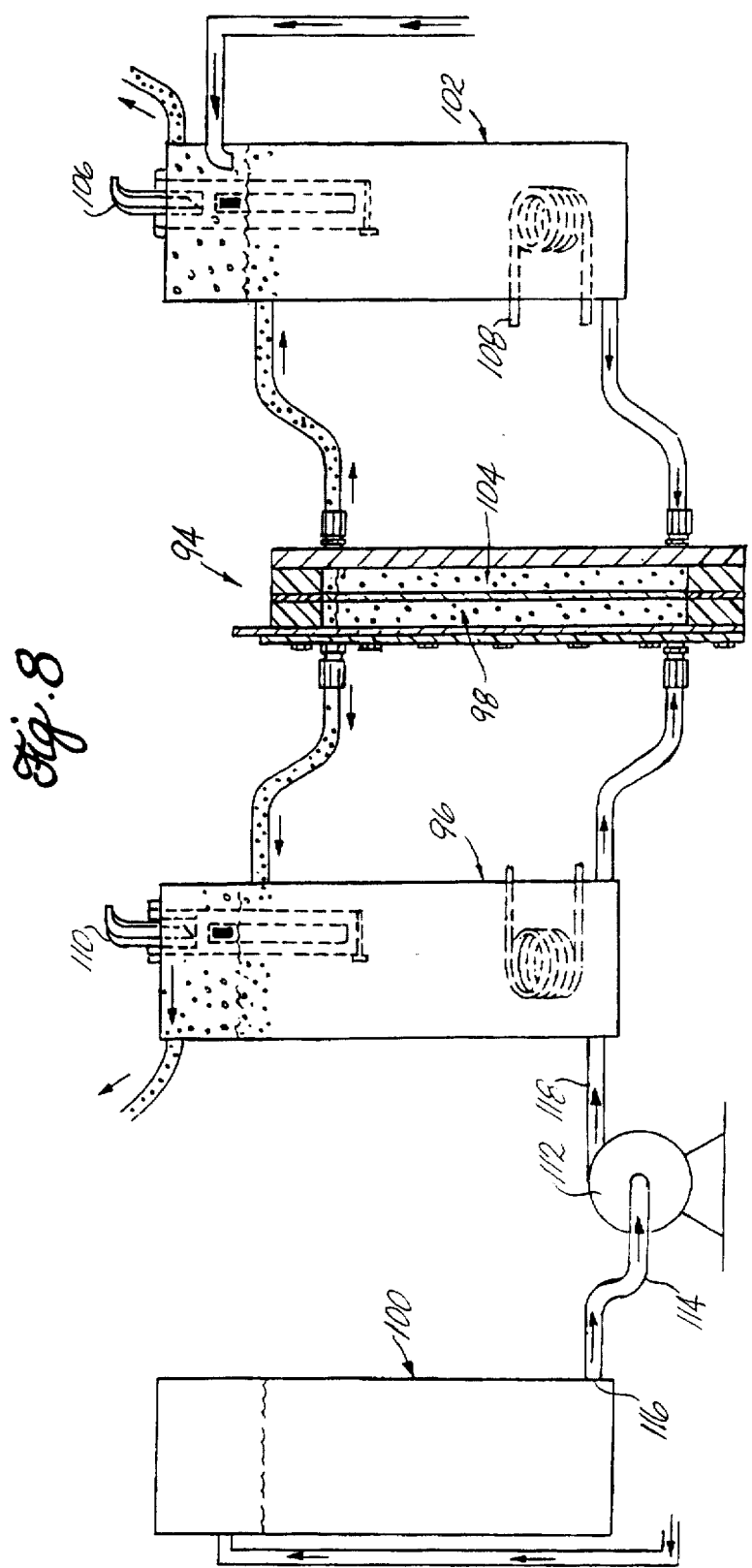
FIG. 8 is a cross-sectional semi-schematic view of a second preferred embodiment of the electrolytic cell of FIG. 1.

FIG. 8 illustrates a second preferred embodiment of an electrolytic cell constructed according to principles of this invention. The second preferred embodiment of the electrolytic cell 94 is similar to the first preferred embodiment of the electrolytic cell described above and illustrated in FIG. 1, comprising an anolyte reservoir 96 external from and hydraulically connected to an anode chamber 98 of the cell, an anolyte make-up tank 100 external from and hydraulically connected to the anolyte reservior 96, and a catholyte reservoir 102 external from and hydraulically connected to a cathode chamber 104 of the cell. The electrolytic cell is configured in identically the same manner as that previously described and illustrated for the first preferred embodiment.

The Second preferred embodiment of the electrolytic cell is different from the first embodiment in that the catholyte reservoir 102 includes a specific gravity sensor 106 in the form of a magnetic reed switch, that operates to regulate the dispensement of fresh water into the catholyte reservoir by allowing the flow of water into the catholyte reservoir when the specific gravity of the catholyte reaches a predetermined value, and closing off the fresh water flow to the catholyte reservoir when the specific gravity concentration returns to a predetermined value. The catholyte reservoir also includes a catholyte cooling means in the form of a cooling coil 106 disposed therein, for maintaining the temperature of the catholyte within a predetermined temperature window. The cooling medium displaced through the cooling coil can include water in the form of either the host water that is being treated by the cell or make-up water, whichever one is at the desired cooling temperature. In a preferred embodiment, it is desired that the catholyte contained within the catholyte reservoir be maintained within a temperature range of from 65° to 90° F.

Additionally, the second embodiment of the electrolytic cell differs from the first embodiment in the both the anolyte and catholyte reservoirs 96 and 102, respectively, are sized having a increased volume of approximately 3 liters. The increase in reservoir volume accommodates a larger volume of catholyte and anolyte that can be cooled, which in turn serves as a heat sink to minimize fluctuations in the temperature of anolyte or catholyte entering the respective anode and cathode chamber. The increase in anolyte and catholyte volume within each respective anolyte and catholyte reservoir also helps to reduce the extent of specific gravity changes to the anolyte and catholyte in each respective reservoir due to the electrochemical reactions occurring within the anode and cathode chambers of the cell; thereby, facilitating smooth and uninterrupted operation of the cell.

Additionally, the second embodiment of the electrolytic cell differs from the first embodiment in that the anolyte reservoir includes a specific gravity sensor 110 of the same type previously described for the catholyte reservoir. The specific gravity sensor operates to speed up the activation of an anolyte metering pump 112 having its inlet end connected to the anolyte feed inlet tube 114, extending from the anolyte discharge outlet 116 positioned at the bottom of the anolyte make-up tank 100, and having its outlet end connected to the anolyte feed inlet tube 118 extending to the bottom of the anolyte reservoir 96. The pump 112 feeds the saturated NaCl solution stored in the anolyte make-up tank 100 to the anolyte reservoir 96 in a metered quantity, according to the amount of anolyte solution exhausted by the electrolytic cell 94 during operation. In a second preferred embodiment, the pump 112 is configured to dispense saturated anolyte solution to the anolyte reservoir at a flow rate in the range of from 0.1 to 0.6 liters per 24 hours (0.5 to 2 gallons per day). It is to be understood, however, that the selected dispensment rate of anolyte solution is dependent on many variables such as the voltage applied between the plates, the condition of the permeable membrane, the specific gravity of the anolyte solution, etc., and, therefore, is understood to vary from this range.

The specific gravity sensor 110 operates to increase and/or decrease the metering rate of the pump 112 according to the specific gravity value of the anolyte contained within the anolyte reservoir 96 so that a predetermined specific gravity value is maintained. For example, if the sensor detects that the specific gravity of the anolyte is below a predetermined value, the pump is activated to increase the metering rate of anolyte. Conversely, if the sensor detects that the specific gravity of the anolyte is above a predetermined value, the pump is activated to decrease the metering rate of the anolyte. Although a specific form of specific gravity sensor has been described and illustrated for use in the second preferred cell embodiment, it is to be understood that other types of sensors, as previously decried for the first preferred embodiment, can be used.

Additionally, the second embodiment of the electrolytic cell may include a water regulating means (not shown) installed in the anolyte make-up tank 100 in the form of a float valve or the like that operates to maintain the liquid level of saturated anolyte solution within the tank at a predetermined level by regulating the dispensement of fresh water therein.

Figure 9:
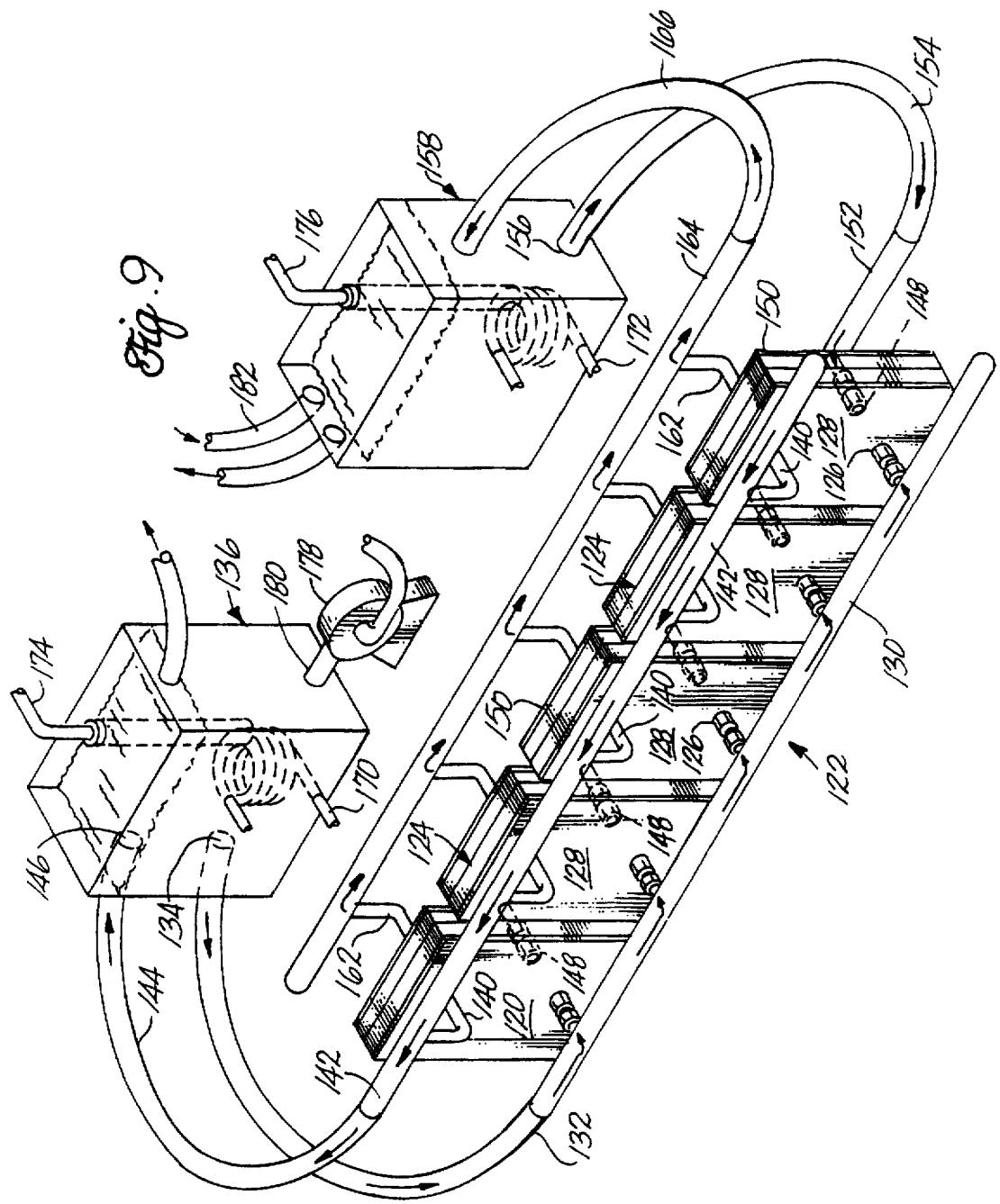
FIG. 9 is a perspective view of a first preferred multi-electrolytic cell embodiment comprising a number of electrolytic cells constructed according to principles of this invention.

FIG. 9 illustrates a first preferred multi-electrolytic cell embodiment 122 comprising five electrolytic cells 124 constructed according to principles of this invention. Each electrolytic cell 124 is identical to each other electrolytic cell, and is constructed in the same manner, and having the same dimensions, as that previously described and illustrated first preferred electrolytic cell embodiment. The anolyte inlet 126 extending from the anode plate 128 of each cell is hydraulically connected in parallel to an anolyte feed manifold 130, which in turn is hydraulically connected, via an anolyte transfer tube 132 to the anolyte outlet 134 of the anolyte reservoir 136. Anolyte is dispensed in parallel flow to the anode chamber of each cell from the anolyte reservoir 136 via the transfer tube 132 and the manifold 130.

The mixed gas outlet 140 extending from the anode plate 128 of each cell is hydraulically connected in parallel to a mixed gas manifold 142, which in turn is hydraulically connected, via a mixed gas transfer tube 146 to the mixed gas and anolyte inlet 146 of the anolyte reservoir. Mixed gas is transferred from the anode chamber of each cell in parallel flow to the anolyte reservoir 136 via the transfer tube 144 and the manifold 142.

The catholyte inlet 148 extending from the cathode plate 150 of each cell is hydraulically connected in parallel to a catholyte feed manifold 152, which in turn is hydraulically connected, via a catholyte transfer tube 154 to the catholyte outlet 156 of the catholyte reservoir 158. Catholyte is dispensed in parallel flow to the cathode chamber of each cell from the catholyte reservoir 158 via the transfer tube 154 and the manifold 152.

The gas and catholyte outlet 162 extending from the cathode plate 150 of each cell is hydraulically connected in parallel to a gas and catholyte manifold 164, which in turn is hydraulically connected, via a gas and catholyte transfer tube 166 to the gas and catholyte inlet 168 of the catholyte reservoir 158. Gas and catholyte is transferred from the cathode chamber of each cell in parallel flow to the catholyte reservoir 158 via the transfer tube 166 and the manifold 164.

The anolyte and catholyte reservoirs 136 and 158, respectively, are each sized having a volume greater than that previously described for the first and second preferred single cell embodiments, to facilitate the increased anode and cathode chamber volume, and to accommodate the increased exhaustion rate of the anolyte and catholyte, associated with using multiple electrolytic cells. In a preferred first multi-cell embodiment, the anolyte and catholyte reservoir each has a volume of approximately 22 liters. An anolyte and catholyte reservoir configured having such a volume accommodates a volume of anolyte and catholyte that acts as a heat sink to provide better anolyte and catholyte temperature control, and acts buffer the effects of specific gravity changes inherent in the electrochemical reactions occurring in both the anode and cathode chamber of each cell.

The anolyte and catholyte chamber 136 and 158, respectively, are each configured in the same manner as previously described and illustrated for the second preferred single cell embodiment, each comprising a cooling coil 170 and 172, and a specific gravity sensor 174 and 176. The specific gravity sensors that are used with each respective anolyte and catholyte reservoir serve the same function as that previously described for the second preferred single cell embodiment, i.e., to regulate the metered flow of saturated anolyte solution from the anolyte make-up tank (not shown) to the anolyte reservoir 136 via the anolyte metering pump 178 and the anolyte feed inlet 180, and to regulate the dispensment of fresh water into the catholyte reservoir 158 via fresh water inlet 182. In the first preferred multi-cell embodiment, the metering pump 178 is configured to dispense saturated anolyte solution to the anolyte reservoir in the range of from 0.2 to 1.1 liters per 24 hours (1 to 4 gallons per day).

The electrolytic cells 124 of the first preferred multi-cell embodiment are electrically connected in parallel and are operated to generate the mixed oxidant gas by applying a total voltage of approximately 30 volts across the cells, which provides a voltage of approximately 6 volts across the anode and cathode of each cell. Application of 30 volts is sufficient to provide a desired total current of from about 75 to 250 amps through the cells, or a current of from about 15 to 50 amps through each cell. The first preferred multi-cell embodiment constructed according to principles of this embodiment generates a quantity of mixed oxidant gas that is approximately five times that of a single electrolytic cell and, therefore, can be used in one application to treat a 7,500 ton cooling tower.

FIG. 11 illustrates a second preferred multi-cell embodiment 184 comprising five electrolytic cells 186. The second preferred multi-cell embodiment is same as the first preferred multi-cell embodiment disclosed above with the exception that manifolds 130, 142, 152 and 164 are not used to facilitate the transport of anolyte, mixed gas, catholyte, and gas and catholyte, respectively, from the anode chamber and cathode chamber of each cell. Rather, the anolyte is supplied to the anode chamber of each cell 186 by an independent anolyte transport tube 190 that is hydraulically connected at one end to the anolyte inlet 192 extending from the anode plate 194, and is connected at an opposite end to an anolyte outlet 196 in the anolyte reservoir 198. The anolyte reservoir 198 is configured having an equal number of independent anolyte outlets 196 to accommodate hydraulic connection with the anolyte inlet 192 of each cell, thereby, eliminating the need for an anolyte feed manifold.

The mixed gas outlet 200 extending from the anode plate 194 of each cell is hydraulically connected via a mixed gas transport tube 202 to a mixed gas inlet 204 of the anolyte reservoir. The anolyte reservoir 198 is configured having an equal number of independent mixed gas inlets 204 to accommodate hydraulic connection with the mixed gas outlet 200 of each cell, thereby, eliminating the need for a mixed gas manifold.

In the second preferred multi-cell embodiment, the catholyte is supplied to the cathode chamber of each cell 186 by a catholyte transport tube 208 that is hydraulically connected at one end to the catholyte inlet (not shown) extending from the cathode plate 212, and is connected at an opposite end to a catholyte outlet 214 in the catholyte reservoir 216. The catholyte reservoir 216 is configured having an equal number of independent catholyte outlets 214 to accommodate hydraulic connection with the catholyte inlet 210 of each cell, thereby, eliminating the need for a catholyte feed manifold.

The gas and catholyte outlet (not shown) extending from the cathode plate 212 of each cell is hydraulically connected via a gas and catholyte transport tube 220 to a gas and catholyte inlet 222 of the catholyte reservoir. The catholyte reservoir 216 is configured having an equal number of independent gas and catholyte inlets 222 to accommodate hydraulic connection with the gas and catholyte outlet of each cell, thereby, eliminating the need for a gas and catholyte manifold.

The electrolytic cells, anolyte reservoir, catholyte reservoir, anolyte make-up tank (not shown), and saturated anolyte metering pump are each configured in the same manner as previously described for the first preferred multi-cell embodiment. Additionally, the electrolytic cells in the second preferred multi-cell embodiment are, like the first preferred multi-cell embodiment, also electrically connected in parallel and are, therefore, operated in the same manner, i.e., applying a total voltage of approximately 30 volts and in the range of from 75 to 250 total amps across the five cells, or approximately 6 volt from 15–50 amps across each cell, to produce the desired mixed oxidant gas.

Although first and second preferred multi-cell embodiments have been specifically described and illustrated comprising five electrolytic cells, it is to be understood that the number of individual electrolytic cells constructed according to principles of this invention that can be combined to in accordance with this invention is not means to be limited. For example, greater or fewer than five electrolytic cells may be combined to provide a generation rate of the mixed oxidant gas sufficient to meet the treatment needs in particular application.

Alternatively, it is to be understood that rather than using multiple electrolytic cells to increase the generation rate of the mixed oxidant gas, a single electrolytic cell of enlarged dimension can be constructed in accordance with principles of this invention. Accordingly, for example, a single cell having five times the surface area of the first and second preferred single cell embodiments could be used to provide approximately the same generation rate of mixed oxidant gas as the first and second preferred multi-cell embodiments comprising five cells. The choice of whether to construct a single enlarged cell or to combine a multiple number of smaller cells is ultimately a decision that is driven by any space constraint for the electrolytic cell(s) and any difference in manufacturing cost.

Accordingly, it is to be understood that, within the scope of the appended claims, the electrolytic cell constructed according to principles of invention may be embodied other than as specifically described herein.

What is claimed is:

1. At least one electrolytic cell for generating a mixed oxidant gas for treating bodies of water, each cell comprising:

an anode chamber defined by an anode plate at one end, a permeable membrane at an opposite end, and a first sealing gasket interposed therebetween;

a cathode chamber adjacent the anode chamber defined by a cathode plate at one end, the permeable membrane at an opposite end, and a second sealing gasket interposed therebetween, the first and second gaskets being separated by the permeable membrane;

an anolyte reservoir external from the anode chamber for accommodating a volume of anolyte therein, wherein the anolyte reservoir is connected to the anode chamber to circulate anolyte thereto and to receive mixed oxidant gas therefrom;

a catholyte reservoir external from the cathode chamber for accommodating a volume of catholyte therein, wherein the catholyte reservoir is connected to the cathode chamber to circulate catholyte thereto and to receive gas therefrom;

means for maintaining the anolyte contained within the anolyte reservoir at a controlled specific gravity;

a specific gravity sensor disposed within the catholyte reservoir that when activated causes water to be dispensed into the catholyte reservoir to maintain a controlled catholyte specific gravity therein.

2. The electrolytic cell as recited in claim 1 comprising an anolyte make-up tank external from the anolyte reservoir and anode chamber for containing a volume of saturated anolyte therein, wherein the anolyte make-up tank is connected to the anolyte reservoir to facilitate saturated anolyte transport thereto.

3. The electrolytic cell as recited in claim 2 comprising a pump connected between the anolyte make-up tank and anolyte reservoir to dispense saturated anolyte solution to anolyte reservoir.

4. The electrolytic cell as recited in claim 3 wherein the means for maintaining the anolyte within the anolyte reservoir at the controlled specific gravity comprises a specific gravity sensor disposed within the anolyte reservoir that when activated adjusts the flow rate of the pump.

5. The electrolytic cell as recited in claim 1 comprising a number of electrolytic cells, wherein the anode chamber of each cell is connected to a common anolyte reservoir external from the anode chamber to effect anolyte transport from the anolyte reservoir to the anode chamber, and to effect transport of mixed gas and anolyte from the anode chamber to the anolyte reservoir.

6. The electrolytic cell as recited in claim 5 comprising a number of electrolytic cells, wherein the cathode chamber of each cell is connected to a common catholyte reservoir external from the cathode chamber to effect catholyte transport from the catholyte reservoir to the cathode chamber, and to effect transport of gas and catholyte from the cathode chamber to the catholyte reservoir.

7. At least one electrolytic cell for generating a mixed oxidant gas comprising:

an anode plate;

a cathode plate opposite to the anode plate;

a permeable membrane interposed between the anode plate and the cathode plate;

an anode sealing gasket interposed between the anode plate and the permeable membrane forming an anode chamber for accommodating a volume of anolyte;

a cathode sealing gasket interposed between the cathode plate and the permeable membrane forming a cathode chamber for accommodating a volume of catholyte;

an anolyte reservoir external from and hydraulically connected to the anode chamber for circulating anolyte at a specific gravity to the anode chamber and for receiving a mixed oxidant gas from the anode chamber;

an anolyte make-up tank external from the anolyte reservoir and anode chamber and hydraulically connected to the anolyte reservoir for providing saturated anolyte to the anolyte reservoir;

means for transporting saturated anolyte from the anolyte make-up tank to the anolyte reservoir; and a catholyte reservoir external from and hydraulically connected to the cathode chamber for circulating catholyte to the cathode chamber and for receiving gas from the cathode chamber.

8. The electrolytic cell as recited in claim 7 comprising means for regulating fresh water dispensement to the catholyte reservoir to keep the catholyte within the catholyte reservoir at a controlled specific gravity.

9. The electrolytic cell as recited in claim 7 wherein the means for transporting saturated anolyte solution comprises a pump installed between the anolyte make-up tank and the anolyte reservoir.

10. The electrolytic cell as recited in claim 9 wherein the anolyte reservoir comprises a sensor that monitors the specific gravity of the anolyte within the anolyte reservoir increases the flow rate of the pump when the specific gravity is below a controlled value.

11. The electrolytic cell as recited in claim 7 wherein the anolyte reservoir comprises a cooling coil to temperature condition the anolyte contained therein.

12. The electrolytic cell as recited in claim 7 wherein the catholyte reservoir comprises a cooling coil to temperature condition the catholyte contained therein.

13. The electrolytic cell as recited in claim 7 comprising a bipolar electrode disposed within the anode chamber.

14. The electrolytic cell as recited in claim 7 comprising a number of electrolytic cells, wherein the anode and cathode chamber of each cell are hydraulically connected to the anolyte and catholyte reservoir for transporting anolyte to and receiving mixed gas from each anode chamber, and for transporting catholyte to and receiving gas from each cathode chamber.

15. The electrolytic cell as recited in claim 14 comprising an anolyte manifold connected between each anode chamber and the anolyte reservoir to facilitate the transport of the anolyte, and comprising a catholyte manifold connected between each cathode chamber and the catholyte reservoir to facilitate the transport of the catholyte.

16. The electrolytic cell as recited in claim 15 comprising a mixed gas manifold connected between each anode chamber and the anolyte reservoir to facilitate transport of the mixed gas and anolyte, and comprising a gas and catholyte manifold connected between each cathode chamber the catholyte reservoir to facilitate transport of the gas and catholyte.

17. The electrolytic cell as recited in claim 14 wherein the anolyte reservoir comprises a sufficient number of individual anolyte outlet ports to accommodate hydraulic connection with a respective anode chamber of each cell to provide anolyte transfer thereto, and wherein the catholyte reservoir comprises a sufficient number of individual catholyte outlet ports to accommodate hydraulic connection with a respective cathode chamber of each cell to provide catholyte transfer thereto.

18. The electrolytic cell as recited in claim 17 wherein the anolyte reservoir comprises a sufficient number of individual mixed gas inlet ports to accommodate hydraulic connection with the anode chamber of each cell to provide mixed gas transfer therefrom, and wherein the catholyte reservoir comprises a sufficient number of individual gas and catholyte inlet ports to accommodate connection with the cathode chamber of each cell to provide gas and catholyte transfer therefrom.

19. At least one electrolytic cell for generating a mixed oxidant gas for treating bodies of water, each cell comprising:

an anode plate;

an anode sealing gasket disposed adjacent to a surface of the anode plate;

a permeable membrane disposed adjacent to a surface of the anode sealing gasket opposite from the anode plate, wherein the anode plate, anode sealing gasket and membrane form an anode chamber therebetween for accommodating a volume of anolyte;

a cathode sealing gasket disposed adjacent to a surface of the permeable membrane opposite from the anode sealing gasket;

a cathode plate disposed adjacent to a surface of the cathode sealing gasket opposite from the permeable membrane, wherein the cathode plate, cathode sealing gasket and membrane form a cathode chamber for accommodating a volume of catholyte;

a bipolar electrode interposed between the anode plate and the permeable membrane;

an anolyte reservoir for accommodating a volume of anolyte external from the anode chamber, wherein the anolyte reservoir is hydraulically connected to the anode chamber to circulate anolyte thereto and receive mixed oxidant gas therefrom, and wherein the anolyte reservoir includes means for maintaining anolyte contained therein at a controlled specific gravity; and a catholyte reservoir for accommodating a volume of catholyte external from the cathode chamber, wherein the catholyte reservoir is hydraulically connected to the cathode chamber to circulate catholyte thereto and receive gas therefrom, and wherein the catholyte reservoir includes means for maintaining catholyte contained therein at a controlled specific gravity.

20. The electrolytic cell as recited in claim 19 comprising an anolyte make-up tank for accommodating a volume of saturated anolyte external from the anolyte reservoir and anode chamber, wherein the anolyte make-up tank is hydraulically connected to the anolyte reservoir to effect anolyte transport thereto.

21. The electrolytic cell as recited in claim 20 comprising a pump installed between the anolyte make-up tank and anolyte reservoir configured to dispense saturated anolyte to the anolyte reservoir.

22. The electrolytic cell as recited in claim 21 wherein the means for maintaining the anolyte at a controlled specific gravity comprises a specific gravity sensor that when activated is configured to adjust the flow rate of the pump.

23. The electrolytic cell as recited in claim 19 wherein the means for maintaining the catholyte at a controlled specific gravity comprises a specific gravity sensor that when activated regulates the dispensement of fresh water into the catholyte reservoir.

24. The electrolytic cell as recited in claim 19 wherein the anolyte reservoir comprises means for temperature conditioning the anolyte contained therein.

25. The electrolytic cell as recited in claim 19 wherein the catholyte reservoir comprises means for temperature conditioning the catholyte contained therein.

26. The electrolytic cell as recited in claim 19 comprising a number of electrolytic cells, wherein the anode chamber of each cell is connected to a common anolyte reservoir external from the anode chamber to effect anolyte transport from the anolyte reservoir to each anode chamber, and to effect transport of mixed gas and anolyte from each anode chamber to the anolyte reservoir.

27. The electrolytic cell as recited in claim 26 comprising a number of electrolytic cells, wherein the cathode chamber of each cell is connected to a common catholyte reservoir external from the cathode chamber to effect catholyte transport from the catholyte reservoir to each cathode chamber, and to effect transport of gas and catholyte from each cathode chamber to the catholyte reservoir.

* * * * *